United States Patent
Kim et al.

(10) Patent No.: US 10,080,246 B2
(45) Date of Patent: Sep. 18, 2018

(54) APPARATUS AND METHOD FOR TRANSMITTING SIGNALS USING MULTIPLE ACCESS SCHEMES

(71) Applicant: LG ELECTRONICS INC., Seoul (KR)

(72) Inventors: Hakseong Kim, Seoul (KR); Hanbyul Seo, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 122 days.

(21) Appl. No.: 14/902,304

(22) PCT Filed: Jul. 1, 2014

(86) PCT No.: PCT/KR2014/005851
§ 371 (c)(1),
(2) Date: Dec. 30, 2015

(87) PCT Pub. No.: WO2015/002432
PCT Pub. Date: Jan. 8, 2015

(65) Prior Publication Data
US 2016/0192420 A1   Jun. 30, 2016

Related U.S. Application Data

(60) Provisional application No. 61/841,895, filed on Jul. 1, 2013, provisional application No. 61/843,463, filed
(Continued)

(51) Int. Cl.
*H04W 74/00* (2009.01)
*H04W 76/02* (2009.01)
(Continued)

(52) U.S. Cl.
CPC .......... *H04W 76/023* (2013.01); *H04W 4/06* (2013.01); *H04W 74/00* (2013.01); *H04W 74/002* (2013.01); *H04W 76/14* (2018.02)

(58) Field of Classification Search
CPC ... H04W 76/023; H04W 74/002; H04W 4/06; H04W 74/0833; H04W 84/047; H04W 84/18; H04L 1/0026
(Continued)

(56) References Cited

U.S. PATENT DOCUMENTS 7,760,699 B1 * 7/2010 Malik .................... H04L 1/005
370/320
2013/0121270 A1 * 5/2013 Chen ...................... H04L 5/001
370/329
(Continued)

FOREIGN PATENT DOCUMENTS

KR   10-2009-0089993   8/2009
KR   10-2010-0040671   4/2010
(Continued)

OTHER PUBLICATIONS

PCT International Application No. PCT/KR2014/005851, Written Opinion of the International Searching Authority dated Oct. 14, 2014, 21 pages.

*Primary Examiner* — Chandrahas B Patel
(74) *Attorney, Agent, or Firm* — Lee, Hong, Degerman, Kang & Waimey

(57) ABSTRACT

The present invention provides a method and a device for differing the scheme of accessing a reception device on the basis of the probability of attempted access to the reception device or an indicator similar thereto. The transmission device according to the present invention transmits signals according to a first scheme or a second scheme on the basis of access attempts or indicators similar thereto and receives
(Continued)

signals according to the first scheme or second scheme on the basis of the access attempts or indictors similar thereto.

12 Claims, 21 Drawing Sheets

Related U.S. Application Data on Jul. 8, 2013, provisional application No. 61/843,886, filed on Jul. 8, 2013, provisional application No. 61/843,888, filed on Jul. 8, 2013, provisional application No. 61/843,889, filed on Jul. 8, 2013, provisional application No. 61/856,001, filed on Jul. 18, 2013.

(51) Int. Cl.
*H04W 4/06* (2009.01)
*H04W 76/14* (2018.01)

(58) Field of Classification Search
USPC .................................................. 370/310–350
See application file for complete search history.

(56) References Cited

U.S. PATENT DOCUMENTS

| | | | | |
|---|---|---|---|---|
| 2014/0036810 | A1* | 2/2014 | Harrison | H04W 72/042 370/329 |
| 2015/0208442 | A1* | 7/2015 | Bai | H04W 74/0875 370/329 |
| 2015/0289307 | A1* | 10/2015 | Li | H04W 8/005 370/329 |

FOREIGN PATENT DOCUMENTS

| | | |
|---|---|---|
| KR | 10-2010-0049058 | 5/2010 |
| KR | 10-2010-0132036 | 12/2010 |
| KR | 10-2013-0040954 | 4/2013 |

* cited by examiner

APPARATUS AND METHOD FOR TRANSMITTING SIGNALS USING MULTIPLE ACCESS SCHEMES

CROSS-REFERENCE TO RELATED APPLICATIONS

This application is the National Stage filing under 35 U.S.C. 371 of International Application No. PCT/KR2014/ 005851, filed on Jul. 1, 2014, which claims the benefit of U.S. Provisional Application Nos. 61/841,895, filed on Jul. 1, 2013, 61/843,463, filed on Jul. 8, 2013, 61/843,886, filed on Jul. 8, 2013, 61/843,888, filed on Jul. 8, 2013, 61/843, 889, filed on Jul. 8, 2013, and 61/856,001 filed on Jul. 18, 2013, the contents of which are all hereby incorporated by reference herein in their entirety.

TECHNICAL FIELD

The present invention relates to a wireless communication system and, more particularly, a method for transmitting and/or receiving a signal in a wireless communication system and an apparatus for the same.

BACKGROUND ART

As an example of a mobile communication system to which the present invention is applicable, a 3rd generation partnership project long term evolution (3GPP LTE) (hereinafter, referred to as LTE) communication system is described in brief.

FIG. 1 is a diagram schematically illustrating a network structure of an E-UMTS as an exemplary wireless communication system.

An evolved universal mobile telecommunications system (E-UMTS) is an advanced version of a legacy universal mobile telecommunications system (UMTS) and basic standardization thereof is currently underway in the 3GPP. E-UMTS may be referred to as an LTE system. For details of the technical specifications of UMTS and E-UMTS, see Release 7 and Release 8 of "3rd Generation Partnership Project; Technical Specification Group Radio Access Network".

Referring to FIG. 1, E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

The UE is fixed or mobile. The UE is a device that transmits and receives user data and/or various kinds of control information though communication with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

One or more cells are managed by one eNB. A cell is configured to use one of bandwidths of 1.25, 2.5, 5, 10, 15, and 20 MHz to provide a downlink (DL) or uplink (UL) transmission service to multiple UEs. Different cells may be configured to provide different bandwidths. The eNB controls data transmission and reception to and from a plurality of UEs. For DL data, the eNB transmits DL scheduling information to notify a corresponding UE of time/frequency resources through which the data is to be transmitted, coding, data size, and hybrid automatic repeat and request (HARQ)-related information. For UL data, the eNB transmits UL scheduling information to a corresponding UE to inform the UE of available time/frequency resources, coding, data size, and HARQ-related information. An interface for transmitting user traffic or control traffic between eNBs may be used. A core network (CN) may include an AG and a network node for user registration for the UE. The AG manages mobility of the UE on a tracking area (TA) basis, each TA including a plurality of cells.

Conventionally, the legacy LTE communication scheme mainly considers wireless communication between an eNB and a UE. However, demands for technology enabling direct communication between UEs have recently increased.

FIG. 2 is a conceptual diagram illustrating direct communication between UEs.

Referring to FIG. 2, UE-to-UE direct communication is performed between UE1 and UE2 and between UE3 and UE4. The eNB may control positions of the time/frequency resources, transmit power and the like for direct communication between UEs through a proper control signal. Direct communication between UEs is referred to as device-to-device (D2D) communication in the following description.

D2D communication has different requirements from legacy LTE communication in many aspects.

DISCLOSURE

Technical Problems

An object of the present invention devised to solve the problem lies in a method for enabling a transmitter to efficiently transmit a signal to a receiver in a wireless communication system.

The technical objects that can be achieved through the present invention are not limited to what has been particularly described hereinabove and other technical objects not described herein will be more clearly understood by persons skilled in the art from the following detailed description.

Technical Solutions

The object of the present invention can be achieved by providing a method and a device for differing the scheme of accessing a receiver on the basis of the probability of attempted access to the reception device or an indicator similar thereto. A transmitter according to the present invention transmits signals according to a first scheme or a second scheme on the basis of access attempts or indicators similar thereto, and the receiver of the present invention receives signals according to the first scheme or second scheme on the basis of the reception access attempts or indictors similar thereto.

The first scheme may be random access, and the second scheme may be scheduled access. The scheduled access scheme may use a predefined resource determined according to a rule predefined or preconfigured for signal transmission.

In one aspect of the present invention, provided herein is a method for transmitting a signal to a receiver by a transmitter, the method including transmitting the signal using a first scheme or a second scheme according to an access attempt probability with respect to the receiver. The first scheme may include transmitting one access preamble sequence of a predetermined number of access preamble sequences, receiving an access response corresponding to the one preamble sequence, and transmitting a signal using a resource according to the access response. The second scheme may include transmitting the signal using a predefined resource.

In another aspect of the present invention, provided herein is a transmitter for transmitting a signal to a receiver, the transmitter including a radio frequency (RF) unit and a processor configured to control the RF unit. The processor may control the RF unit based on an access attempt probability with respect to the receiver to transmit the signal according to a first scheme or a second scheme. The processor may control the RF unit according to the first scheme to transmit one access preamble sequence of a predetermined number of access preamble sequences, receive an access response corresponding to the one preamble sequence, and transmit the signal using a resource according to the access response. The processor may control the RF unit according to the second scheme to transmit the signal using a predefined source.

In another aspect of the present invention, provided herein is a method for receiving a signal from a transmitter by a receiver, the method including receiving the signal using a first scheme or a second scheme according to an access attempt probability with respect to the receiver.

In another aspect of the present invention, provided herein is a method for receiving a signal from a transmitter by a receiver, the method including receiving the signal using a first scheme or a second scheme according to an access attempt probability with respect to the receiver. The processor may control the RF unit to receive the signal using the first scheme or second scheme according to the access attempt probability.

In the respective aspects of the present invention, the signal may be transmitted using the first scheme when the access attempt probability is lower than a reference value, wherein the signal may be transmitted using the second scheme when the access attempt probability is not lower than the reference value.

In the respective aspects of the present invention, the receiver includes a RF unit and a processor configured to control the RF unit.

In the respective aspects of the present invention, the second scheme may include generating a first layer by coding the signal at a first coding rate and a second layer by coding the signal at a second coding rate, and transmitting this first layer and the second layer using the predefined resource.

In the respective aspects of the present invention, the signal may have a high transmission priority.

In the respective aspects of the present invention, the signal may be broadcast.

In the respective aspects of the present invention, the transmitter and the receiver may be user devices supporting device-to-device (D2D) communication.

The above technical solutions are merely some parts of the embodiments of the present invention and various embodiments into which the technical features of the present invention are incorporated can be derived and understood by persons skilled in the art from the following detailed description of the present invention.

Advantageous Effect

According to embodiments of the present invention, a probability of successfully performing communication between a transmitter and a receiver in a wireless communication system may be increased.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
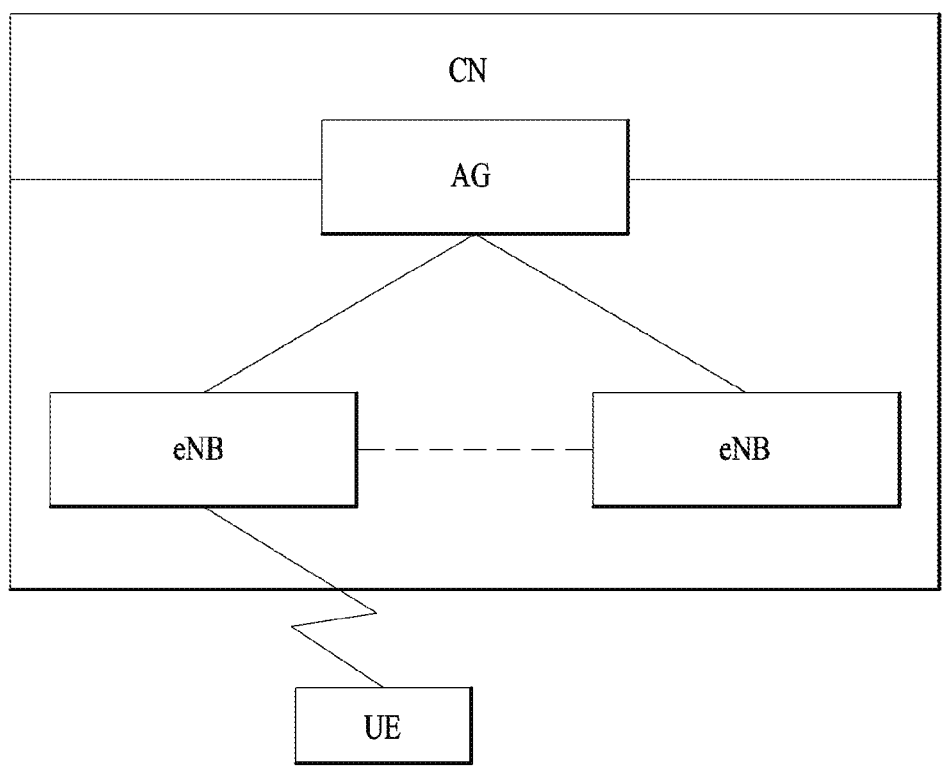
FIG. 1 illustrates a network structure of an E-UMTS as an exemplary wireless communication system.
Figure 2:
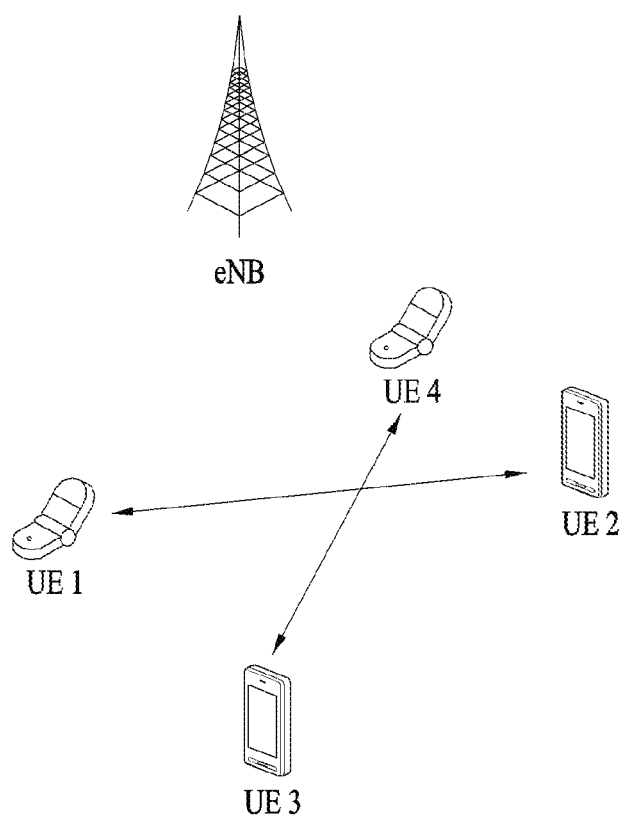
FIG. 2 is a conceptual diagram illustrating direct communication between UEs, namely device-to-device (D2D) communication.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). The CCs may or may not be adjacent to each other in the frequency domain.

The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. In frequency division duplex (FDD), since the UL operation band is different from the DL operation band, different carrier frequencies are linked to constitute one cell, and SIB2 linkage designates, as a frequency of a UL CC, a frequency different form the frequency of a DL CC which the UE accesses. In other words, in the case of FDD, in a cell constituted by a DL CC and a UL CC linked to the DL CC, the DL CC and the UL CC operate at different frequencies. In time division duplex (TDD), the UL operation band is identical to the DL operation band. Accordingly, one carrier frequency constitutes one cell, and SIB2 linkage designates the frequency of a DL CC which the UE accesses as the frequency of a corresponding.

In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

In addition, in the present invention, a PBCH/(e)PDCCH/PDSCH/PUCCH/PUSCH region refers to a time-frequency resource region to which PBCH/(e)PDCCH/PDSCH/PUCCH/PUSCH has been mapped or may be mapped.

As described above, to efficiently perform D2D communication, radio resources for UE-to-UE communication need to be efficiently allocated. Particularly, a method for quickly transmitting a signal without delay in emergency is required for D2D communication. The present invention proposes a method to satisfy this requirement.

To this end, operations in an LTE system to which the present invention is applicable will be reviewed and then a method for efficiently performing D2D communication using a random access procedure (also referred to as a random access channel (RACH) procedure) in the LTE system will be proposed.

Figure 3:
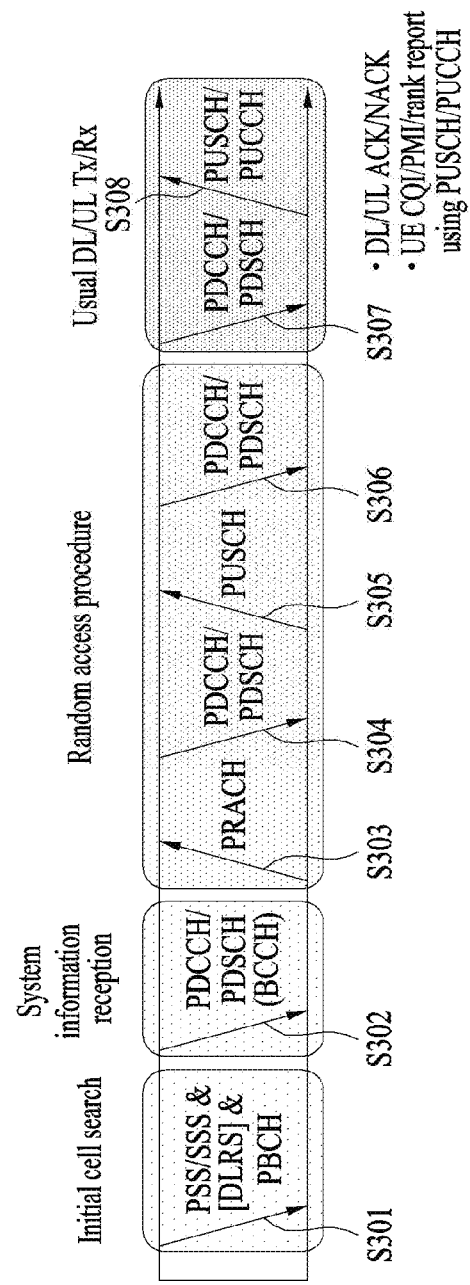
FIG. 3 illustrates physical channels used in a 3GPP system and a general signal transmission method using the same.

FIG. 3 illustrates physical channels used in a 3GPP system and a general signal transmission method using the same.

When a UE is powered on or enters a new cell, the UE performs initial cell search such as establishment of synchronization with an eNB (S301). To this end, the UE may receive a primary synchronization signal (PSS) and a secondary synchronization signal (SSS) from the eNB, establish synchronization with the eNB, and acquire information such as a cell identity (ID). Thereafter, the UE may receive a physical broadcast channel (PBCH) from the eNB to acquire information broadcast in the cell. Meanwhile, the UE may receive a downlink reference signal (DL RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information (S302).

When the UE accesses an eNB for the first time or there is no radio resource for signal transmission, the UE may perform a random access procedure for the eNB (S303 to S306). To this end, the UE may transmit a specific sequence as a preamble through a physical random access channel (PRACH) (S303 and S305) and receive a response message to the preamble through the PDCCH and the PDSCH corresponding to the PDCCH (S304 and S306). In a contention-based random access procedure, a contention resolution procedure may be additionally performed.

The UE which has performed the above procedures may receive a PDCCH/PDSCH signal (S307) and transmit a PUSCH/PUCCH signal (S308) according to a general UL/DL signal transmission procedure. In particular, the UE receives downlink control information (DCI) through the PDCCH. Herein, the CCI includes control information such as resource allocation information for the UE and comes in a different format according to the purpose thereof.

Control information that the UE transmits to the eNB or receives from the eNB through uplink includes a UL/DL acknowledgement (ACK)/negative ACK (NACK) signal and channel state information (CSI) such as a channel quality indicator (CQI), a precoding matrix (PMI) and a rank indicator (RI). For the 3GPP LTE system, the UE may transmit the ACK/NACK signal and only control information (UCI) such as the CSI over a PUSCH and/or PUCCH.

Figure 4:
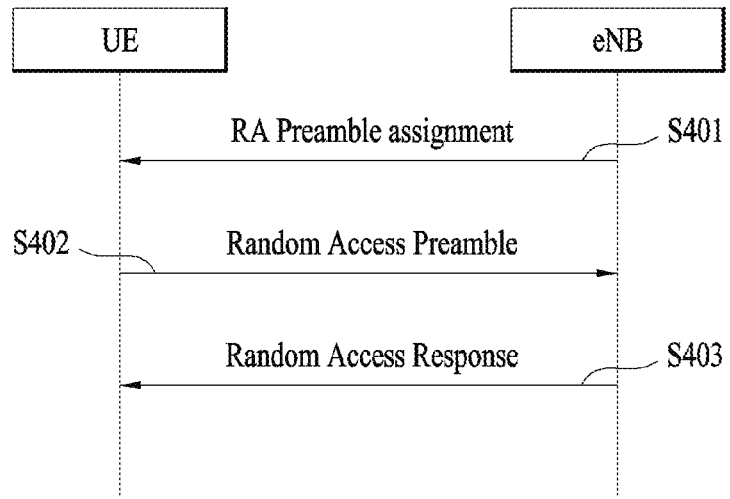
FIGS. 4 and 5 specifically illustrate a random access procedure used in the present invention.
Figure 5:
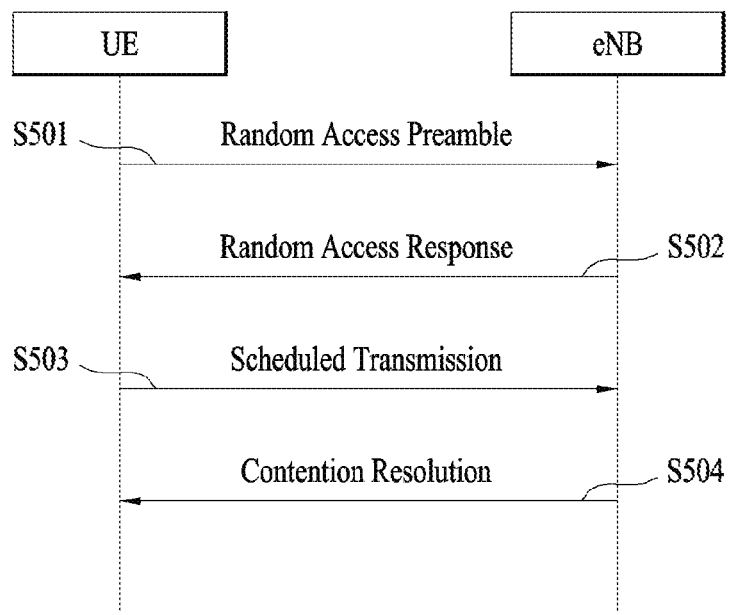

FIGS. 4 and 5 specifically illustrate a random access procedure used in the present invention.

The UE performs the random access procedure in the following cases.

The UE performs initial access since there is no radio resource control (RRC) connection to an eNB.

The UE accesses a target cell for the first time in a handover procedure.

The random access procedure is requested by a command from the eNB.

Data to be transmitted on uplink is generated while uplink time synchronization is not established, or a designated radio resource used to request a radio resource is not allocated.

A recovery procedure is performed due to radio link failure or handover (HO) failure.

In selecting a random access preamble in the LTE system, both a contention-based random access procedure, through which the UE selects one preamble to use within a specific set, and a non-contention-based random access procedure, through which a random access preamble allocated to a specific UE by the eNB is used, are provided. The non-contention-based random access procedure may be used only in the HO procedure or only when the procedure is requested according to a command from the eNB.

A random access procedure that a UE performs with a specific eNB may include (1) the UE transmitting a random access preamble to the eNB (hereafter, referred to as transmission of "a first message (message 1)" if there is no confusion), (2) receiving a random access response from the eNB in response to the transmitted random access preamble (hereafter, referred to as reception of "a second message (message 2)" if there is no confusion), (3) transmitting a UL message using the information received through the random access response message (hereafter, referred to as transmission of "a third message (message 3)" if there is no confusion) and (4) receiving a message corresponding to the UL message from the eNB (hereafter, referred to as reception of "a fourth message (message 4)" if there is no confusion).

FIG. 4 specifically illustrates operations of the UE and the eNB in the non-contention-based random access procedure.

(1) Assignment of a Random Access Preamble

As described above, the non-contention-based random access procedure may be performed (1) in the HO procedure, and (2) when the procedure is requested by a command from the eNB. Of course, the condition-based random access procedure may also be performed in both cases.

To ensure the non-contention-based random access procedure, it is important to receive a designated random access preamble which has no possibility of collision from the eNB. The random access preamble may be indicated to the UE through an HO command or a PDCCH command. Thereby, the random access preamble is assigned to the UE (S401).

(2) Transmission of Message 1

After the UE is assigned a random access preamble solely designated thereto, the UE transmits the designated random access preamble to the eNB (S402).

(3) Reception of Message 2

After transmitting the random access preamble in step S402, the UE attempts to receive a random access response directed thereto within a random access response window indicated by the eNB through system information or an HO command (S403). More specifically, the random access response information may be transmitted in the form of media access control (MAC) protocol data unit (PDU). The MAC PDU may be delivered over a PDSCH. In addition, in order to properly receive information delivered over the PDSCH, the UE monitors the PDCCH. Herein, the monitoring operation refers to an attempt to decode each PDCCH candidate within a time-frequency resource set where the PDCCH may be present according to all monitored DCI formats. The time-frequency resource set in which the UE may discover a PDCCH thereof in a subframe is referred to as a search space. Individual resources on which the PDCCH may be transmitted in the search space are referred to as PDCCH candidates. A set of PDCCH candidates for the UE to monitor is defined as the search space. The PDCCH carries information about a UE to receive the PDCCH, information about the frequency and time of a radio resource of the PDSCH, and DCI such as the transmission format of the PDSCH. Once the UE succeeds in receiving the PDCCH transmitted thereto, the UE may properly receive a random access response transmitted over the PDSCH according to the information on the PDCCH. The random access response may include a random access preamble ID (e.g., a random access radio network temporary identifier (RA-RNTI)), a UL grant indicating a UL resource, a cell radio network temporary identifier (C-RNTI) and a timing advance command (TAC).

The random access preamble ID is needed for a random access response since one random access response contains random access response information for one or more UEs. That is, it is necessary to announce a UE for which the UL grant, the temporary C-RNTI and the TAC are valid. In this step, it is assumed that the UE selects a random access preamble ID coinciding with a random access preamble the UE has selected in step S402.

In the non-contention-based random access procedure, when the UE receives random access response information, the UE may terminate the random access procedure, determining that the random access procedure has been normally performed.

FIG. 5 is a diagram illustrating operations of the UE and the eNB performed in the condition-based random access procedure.

(1) Transmission of Message 1

A UE may randomly select a random access preamble from a set of random access preambles indicated through system information or an HO command, and select and transmit a physical RACH (PRACH) resource on which the random access preamble may be transmitted (S501).

(2) Reception of Message 2

Random access response information is received using a method similar to the method used in the non-contention-based random access procedure. That is, after transmitting the random access preamble as performed in step S401, the UE attempts to receive a random access response thereof within a random access response reception window indicated through the system information or an HO command by an eNB, and receives corresponding RA-RNTI information (S402). Thereby, the UE may receive a UL grant, a temporary C-RNTI and a TAC.

(3) Transmission of Message 3

If the UE receives a valid random access response, the UE processes the information included in the random access response. That is, the UE applies the TAC and stores the temporary C-RNTI. In addition, the UE transmits data (i.e., message 3) to the eNB using the UL grant (S403). Message 3 should include an ID of the UE. This is because the eNB cannot determine which UEs perform the random access procedure in the contention-based random access procedure and the UEs need to be identified for future contention resolution.

Two methods to include the ID of the UE in message 3 have been discussed. According to a first method, if the UE has a valid cell ID assigned thereto in a corresponding cell before the random access procedure, the UE transmits the cell ID thereof via a UL transmission signal corresponding to the UL grant. On the other hand, if the UE has not been assigned a valid cell ID before the random access procedure, the UE transmits its unique ID (e.g., System Architecture Evolution (SAE)-Temporary Mobile Subscriber Identity (S-TMSI) or a random ID) in the message. In general, the unique ID is longer than the cell ID. Once the UE has transmitted data corresponding to the UL grant, the UE starts a contention resolution timer.

(4) Reception of Message 4

After transmitting the data including the ID of the UE through the UL grant included in the random access response, the UE awaits instruction from the eNB for contention resolution. That is, the UE attempts to receive a PDCCH in order to receive a specific message (S404). Two methods for receiving the PDCCH have been discussed. As described above, if message 3 is transmitted according to the UL grant using the ID of the UE or the cell ID, the UE may attempt to receive a PDCCH using the cell ID thereof. If the ID is a unique ID, the UE may attempt to receive a PDCCH using the temporary C-RNTI included in the random access response. In the former case, if the UE receives the PDCCH using the cell ID thereof before the contention resolution timer expires, the UE terminates the random access procedure, determining that the random access procedure has been normally performed. In the latter case, if the UE receives a PDCCH using the temporary C-RNTI before the contention resolution timer expires, the UE checks the data delivered through the PDSCH indicated by the PDCCH. If the data contains the unique ID of the UE, the UE terminates the random access procedure, determining that the random access procedure has been normally performed.

Generally, for different devices to transmit/receive data, an access establishment procedure is required. In LTE, the UE transmits a preamble in a predetermined form, and the eNB correspondingly responds to the preamble and performs scheduling in the random access procedure in order to transmit/receive data to/from the eNB. Then, a communication link is set up through the connection request and confirmation procedures.

<Random Access Versus Scheduled Access>

Figure 6:
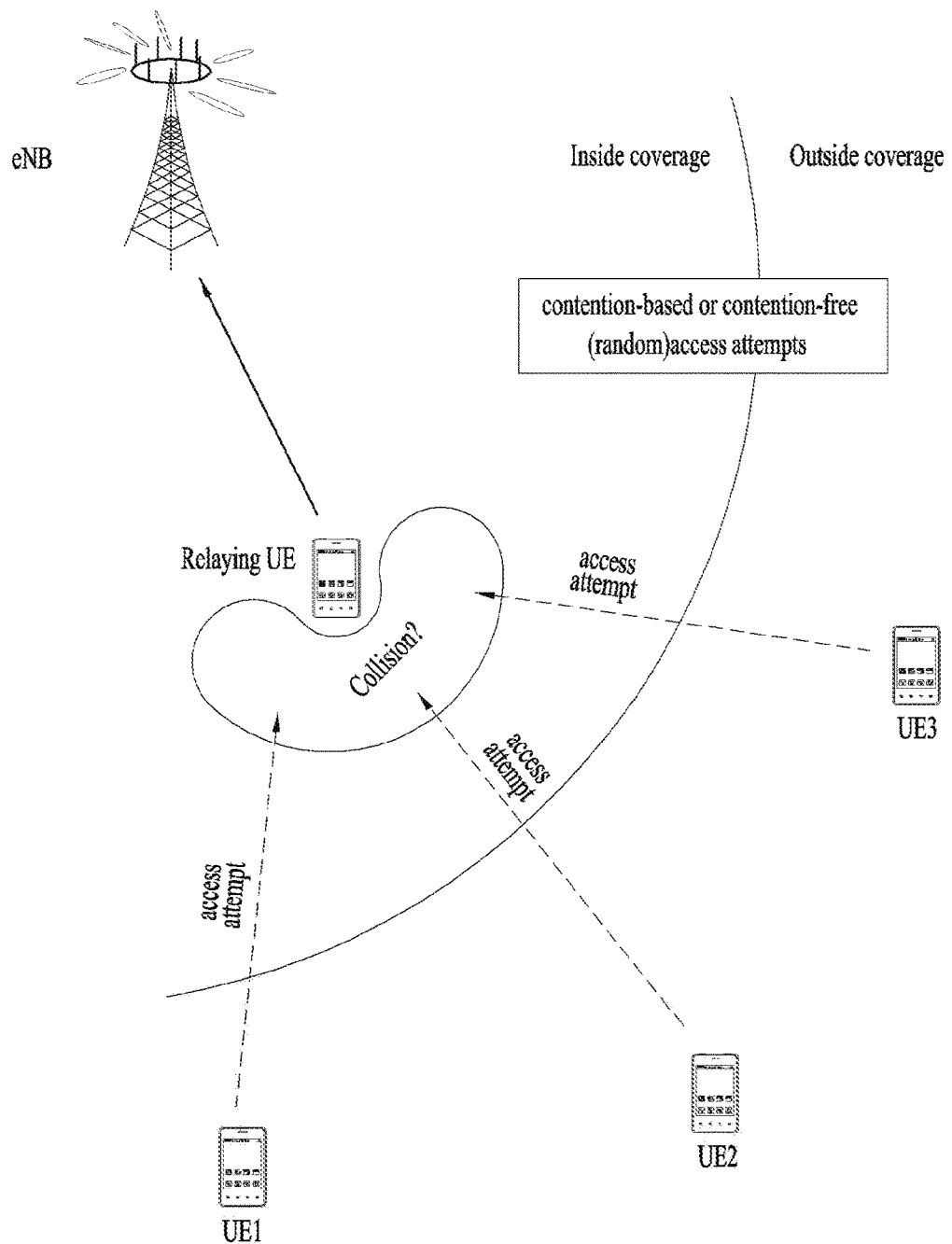
FIG. 6 illustrates an exemplary situation wherein a plurality of transmitters attempts to access one receiver simultaneously.

FIG. 6 illustrates an exemplary situation wherein a plurality of transmitters attempts to access one receiver simultaneously. In particular, FIG. 6 illustrates a situation wherein UEs out of the network coverage attempt to perform contention-based or contention-free (random) access to a UE within the network coverage. Hereinafter, embodiments of D2D communication will be mainly described. However, multiple transmitters may also attempt to transmit signals to one receiver simultaneously in communication other than D2D communication, and accordingly the embodiments of the present invention are applicable not only when D2D communication is performed but also when other types of communication for which signal transmission from transmitters attempting to access one receiver simultaneously need to be coordinated are performed.

When multiple UEs attempt to transmit data (to one eNB or UE), transmission is implemented through a connection establishment procedure using a random access channel as described above. However, referring to FIG. 6, when UEs whose number is greater than or equal to a certain number attempt to perform access simultaneously, collision will occur due to limited resources (e.g., the number of the preambles maintaining (pseudo) orthogonality).

In the random access procedure, UEs attempting access simultaneously operate smoothly if the number of UEs is small. However, if the number of UEs increases beyond a certain number, the number or probability of collisions increases drastically and thus the probability of successful accesses drops. Accordingly, if the number of UEs attempting to access an eNB or a UE is excessively large and thus access is rarely successful, another access scheme is required.

To overcome the problem caused by sharing of common resources among multiple UEs, a certain amount of resources may be independently assigned to each UE or UE group such that each UE or UE group is not allowed to use resources assigned to the other UEs, but stably attempts to perform access and succeed in performing access. On the other hand, UEs which are not assigned a resource may not be allowed to even make an attempt. To address this issue, the time and frequency resources may be equally assigned to all UEs. With this method, the time for which the UEs wait before performing transmission may increase. However, compared to the random access scheme which does not allow transmission if the number of signals to transmit simultaneously is greater than or equal to a certain number, the scheduled access scheme allows UEs, although not many UEs, to stably and persistently establish and release connection according to, for example, a sequence, priorities or a predetermined rule. However, even if only a small number of UEs substantially have data to transmit, the amount of resources assigned to each UE may be very small, and thus resources assigned to UEs which do not have data to transmit may remain unused, which is a waste.

The description given above clearly shows advantages and disadvantages of the random access scheme and the scheduled access scheme according to the number (probability) of UEs attempting to perform access simultaneously or the number (probability) of UEs frequently attempting to establish and release connection.

Accordingly, to make the most use of the advantages of the random access scheme and the scheduled access scheme, it is proposed that an access scheme be selected and operated according to the number or probability of the UEs attempting to perform access, the number of idle UEs in a cell, or an associated pseudo-indicator such as statistics of previous accesses.

For example, suppose that the proposed schemes are operated according to the probability of access attempts. If the access attempt probability (AAP) is low, namely if the number of UEs attempting to perform access is not large, message transmission or packet transmission is attempted according to the random access scheme. If the AAP is high, namely if the number of UEs attempting to perform access is large, message transmission or packet transmission is attempted according to the scheduled access scheme. Whether to use the random access scheme or the scheduled access scheme may be determined based on a proper value before collisions and retransmissions excessively increase according to attempts of random access of an excessive number of UEs and thus a level at which access is disabled or is difficult to perform is reached.

Herein, the scheduled access scheme refers to transmission of an intended message in a pre-designated region or in a resource region which a UE is capable of calculating according to a pre-assigned or pre-defined rule. According to this scheme, even if there are many UEs attempting to perform access, transmission will be ensured over time since the respective UEs are assigned unique transmission resources. With the random access scheme, in contrast, if multiple UEs attempt to perform access, it is not possible to succeed in performing access because of repeated collisions.

In the scheduled access scheme, various resource assignment methods may be used. For example, resources may be determined based on a unique attribute of a UE such as a UE ID. The UE ID may be used as it is. However, it may be more preferable to reduce an ID space through a process such as hashing, which refers to mapping of multiple UE IDs onto one new ID, and to, for example, generate a virtual ID and determine/map a resource region based on the generated virtual ID. However, reducing the ID space may lead to redundant virtual IDs, which are likely to cause resource collision. One method to address this issue is to vary a resource determination rule over time. According to this method, a mapping rule may be designed such that, even if resource collision occurs between virtual ID#1 and virtual ID#2 at a specific time t1, collision does not occur at another time t2. In this case, infinite access failure which may occur when the random access scheme is applied may be attenuated to some degree or may be avoided.

Case A: Low AAP

As described above, if the AAP is low, substantial collision rarely occurs even if the random access scheme is used at the risk of collision since there are not many UEs which substantially attempt to perform access. Accordingly, RACH-based full-rate transmission does not cause any problem.

In addition, when a UE out of network coverage desires to perform (urgent) broadcast, a request for the broadcast may be made to a cluster head to implement broadcasting. That is, the UE may join a cluster by monitoring a signal of the cluster head and perform RACH-based broadcast using the cluster head.

Case B: High AAP

If the number of UEs attempting access increases (on the assumption of restricted access attempt resources), one or more UEs are very likely to use the same resource. As a result, collision occurs. In other words, collision occurs when overload increases. A special method to stably deliver a message is required in this situation. For example, the aforementioned scheduled access scheme may be employed. That is, a UE having a signal to transmit or a predetermined signal may transmit a message on an exclusively assigned resource, thereby avoiding collision with the other UEs. This method is not good in terms of resource usage efficiency since a pre-reserved resource is likely to be wasted if the UE does not transmit a message. However, this method may be efficient when there is an urgent message which needs to be transmitted without delay or information which should be delivered within a specific time in relation to system operation.

Figure 7:
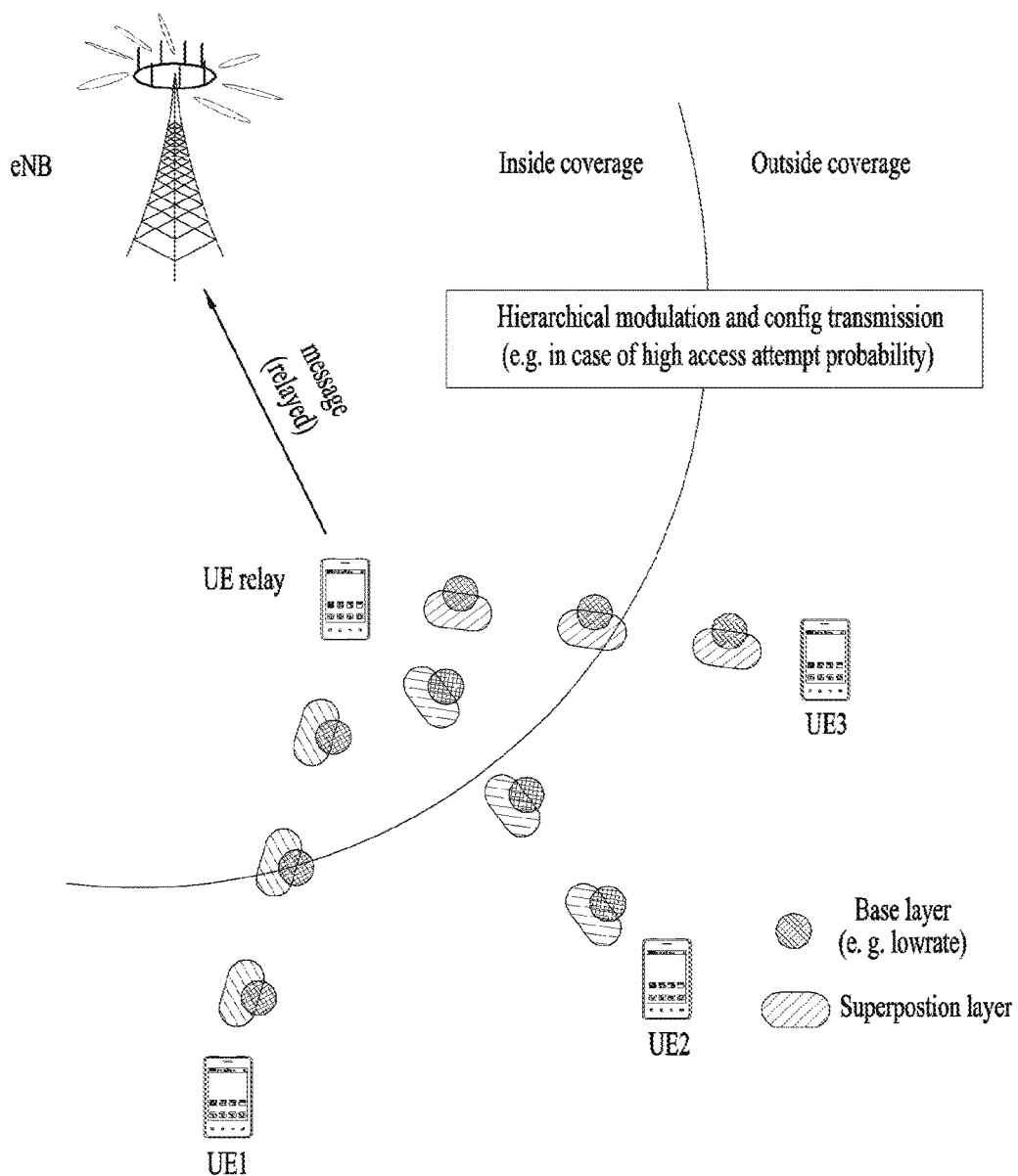
FIG. 7 illustrates an access scheme according to one embodiment of the present invention.

FIG. 7 illustrates an access scheme according to one embodiment of the present invention.

In another scheme which is applicable independently of or in conjunction with the scheduled access scheme, transmission may be performed by applying the technique of hierarchical modulation and coding (M&C). For example, referring to FIG. 7, a UE may transmit two layers subjected to different M&Cs, namely a layer subjected to low rate coding (and modulation) and a layer subjected to high rate coding (and modulation). When the former layer is defined as a low rate base layer and the latter layer is defined as a high rate superposition layer, the base layer will have a relatively high probability of decoding success in a situation wherein severe interference occurs, while the superposition layer will have a relatively low probability of decoding success in the same situation. The base layer may be successfully decoded even if collision occurs. If collision does not occur, the superposition layer may also be successfully decoded. That is, the base layer alone may be decoded or both the base layer and the superposition layer may be decoded. Accordingly, it may be expected that average throughput will be improved compared to simple transmission of a single layer, namely transmission in a single coding and modulation scheme.

The scheduled access scheme ensures transmission resources, and thus the scheduled access scheme represents a kind of pre-scheduling. That is, in the scheduled access scheme, it is assumed that sources are pre-assigned semi-statically or statically. In this sense, a message may be immediately transmitted in the initial transmission step (corresponding to the preamble transmission step which is an initial step of random access). In addition, if any of the transmission resources is not fully ensured, the message may be immediately transmitted. Alternatively, it is possible to perform the aforementioned superposition coding as a transmission technique for this step to immediately perform transmission, for example, to transmit a base layer and additional superposition layer(s).

Meanwhile, when transmission to a UE having a high AAP from a UE outside the network coverage needs to be performed, it is rarely possible to use RACH-based random access. In this case, a UE desiring to transmit a signal from outside the network coverage may perform transmission to the UE having a high AAP in a manner that the UE outside the network coverage becomes a cluster head, schedules itself and transmits a broadcast message. Methods for a UE to become a cluster head will be described in <Escaping a collision situation by becoming a cluster head> later.

The present invention uses both the resolution methods of Case A and the resolution methods of Case B together. That is, the present invention proposes a system in which a UE operates according to the resolution methods of Case A in the situation of Case A and according to the resolution methods of Case B in the situation of Case B. UEs are not implemented to use only the resolution methods of Case A or the resolution methods of Case B. Rather, the resolution method(s) of Case A or the resolution method(s) of Case B are selectively applied based on the number of UEs simultaneously attempting access, the AAP, the access attempt density and the like. For example, when a UE has a low AAP in a low load cell, the UE transmits a message through the random access procedure described above (or a pseudo-random access procedure, which will be described later). More specifically, when an emergency call is necessary, for example, the UE may perform RACH-based broadcast or groupcast. On the other hand, when a high AAP is expected, which is the case of a high load cell, transmission according to the scheduled access scheme and/or superposition transmission of multiple layers using the hierarchical M&C technique may be performed to ensure that a signal reaches a target receiver more or less stably even in a situation wherein severe interference operates. A UE which is outside network coverage of a high AAP may become a cluster head and deliver a broadcast message. The UE may use various methods to check the number of UEs attempting access simultaneously, the AAP, and the access attempt density, and embodiments of the present invention are applicable regardless of the methods which are used. Since the object of the present invention is not to recognize information about the methods, specific description of the information will not be given.

The proposed method is applicable to both random access and scheduled access which occur between a UE and a cluster head outside the network coverage, or between a UE and a relay UE (i.e., a node serving as a relay), between a UE and an eNB, and between a relay UE and an eNB in a partial network.

Among the methods described above, the hierarchical M&C technique may be used in conjunction with a part of conventional RACH operations. For example, RACH preamble-based random access may be used to perform transmission of message 1 of the RACH procedure or transmission of msg1, which will be destroyed later, while hierarchical coding or superposition coding may be used to transmit message 3 described above or msg3, which will be described later, in order to stably deliver message 3 or msg3.

Figure 8:
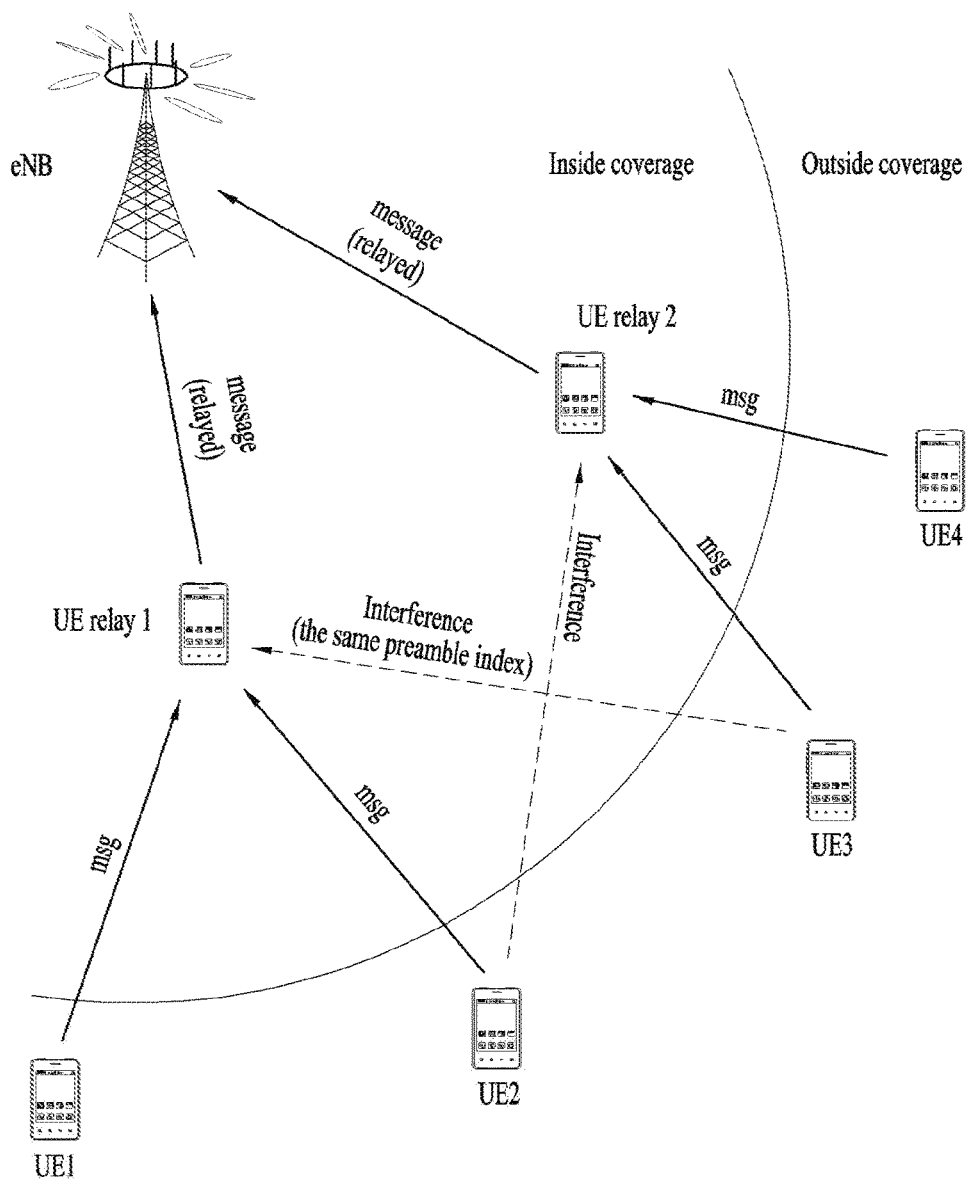
FIG. 8 illustrates another exemplary situation wherein a plurality of transmitters attempts to access one receiver simultaneously.

FIG. 8 illustrates another exemplary situation wherein a plurality of transmitters attempts to access one receiver simultaneously.

In the situation illustrated in FIG. 8, multiple relay UEs are positioned close to each other, and support random access or scheduled access of multiple UEs. RACH resource coordination is not performed between LTE cells. However, in the situation of FIG. 8, the multiple relay UEs may happen to use the same preamble resource, and thus coordination among the relay UEs may be needed for random access resources. In this context, more preamble resources may be needed to assign exclusive resources to the multiple relay UEs. Of course, for relay UEs which can be considered as not being subjected to interference, it is better to reuse the same preamble resource.

An eNB may semi-statically assign coordination of random access resource configurations (e.g., a preamble resource index, a mask, time-frequency resources, access slot configuration (PRACH configuration), etc.) based on locations or measurement information of the respective relay UEs.

Random Access-based D2D

According to an embodiment of the present invention, resources for D2D communication may be assigned by an eNB or a cluster head. To this end, a transmission (Tx) UE performing D2D communication may make a request to the eNB or the cluster head for a radio resource, and the eNB or cluster head may assign a resource in response. Thereby, the Tx UE may transmit a signal to one or more reception (Rx) UEs through the assigned resource. When a UE outside the network coverage desires to transmit a D2D signal generated according to, for example, an emergency situation, the UE may become a cluster head to assign a radio resource for D2D communication. In the following description, a method for a Tx UE to randomly access an eNB in a manner similar to the random access procedure to initiate D2D communication is proposed.

In one embodiment of the present invention, it is proposed that direct communication between UEs be implemented in a manner of broadcast, groupcast or group communication service by changing messages 1 to 4 of the legacy random access procedure as described below. Hereinafter, for simplicity of description, message 1, message 2, message 3 and message 4 are expressed as msg1, msg2, msg3 and msg4, respectively.

As used in the following description, msg1, msg2, msg3, and msg4 represent information or signals in the steps described below. The following steps are procedures which are generally applied to several proposed methods, and may not be exactly the same as procedures applied to a specific method. For simplicity, the steps are classified as follows.

Msg1 (Step 1):

Step 1 may be defined as a signal announcing that broadcast/groupcast signal transmission (to be implemented in step 3) will be attempted according to a rule that is subsequently determined. Herein, the aforementioned signal may be referred to as msg1 for simplicity. The signal may be delivered from a D2D UE to a specific eNB. According to a method, other D2D UEs may receive or overhear msg1.

Msg2 (Step 2):

Step 2 is a response of the eNB to Step 1. Step 2 delivers information (e.g., resource assignment, power control, timing lapse, cyclic prefix (CP) length, and the like) which is needed for the D2D UE having requested Step 1 to transmit a broadcast/groupcast signal corresponding to msg3. Herein, the signal may be referred to as msg2.

Msg3 (Step 3):

Step 3 is a procedure in which the D2D broadcast/groupcast Tx UE having requested Step 1 delivers a broadcast/groupcast signal to a D2D Rx UE. In some cases, the signal may be delivered only to a restricted D2D Rx UE or UE group. That is, the subject to receive the broadcast/groupcast signal may be limited. Further, in some cases, an eNB may be allowed to receive the signal and perform a proper operation (e.g., relay or repetitive transmission) in response. Herein, the signal may be referred to as msg3.

Msg4 (Step 4):

Step 4 represents an operation of assisting normal implementation of Step 3. Step 3 causes an operation to be performed according to whether signal reception is successful or according to a channel over which a signal is incorrectly received and a cause of incorrect signal reception. In some cases, the eNB may broadcast/groupcast, to D2D Rx UEs or an Rx UE group, a message (msg3) transmitted in Step 3, at a transmission time of Step 4. Herein, the aforementioned signal may be referred to as msg4.

The procedure described above may appear to be similar to the random access procedure. However, the overall operation and functions of the procedure described using the term random access procedure or the details of the random access procedure may be different from those of the random access procedure. Unless stated otherwise, the procedure will re-employ the random access procedure and functions.

There may be various types of RACH-based D2D broadcast scenarios based on a part or the entirety of the aforementioned procedure. After a D2D broadcast Tx UE receives a broadcast scheduling request and a response, the D2D broadcast Tx UE may directly transmit a broadcast signal to the Rx UE or eNB, or the Rx UE or eNB may overhear the broadcast scheduling request and response. When D2D communication is performed in a manner similar to the random access procedure, a D2D broadcast signal may be transmitted in a simple manner by making the most use of the legacy random access procedure and functions thereof (e.g., a preamble, a resource, an RA-RANTI, a request/response, contention resolution, timing, etc.). Hereinafter, description will be given of exemplary application of D2D communication based on the aforementioned procedure or messages, with reference to the drawings.

Figure 9:
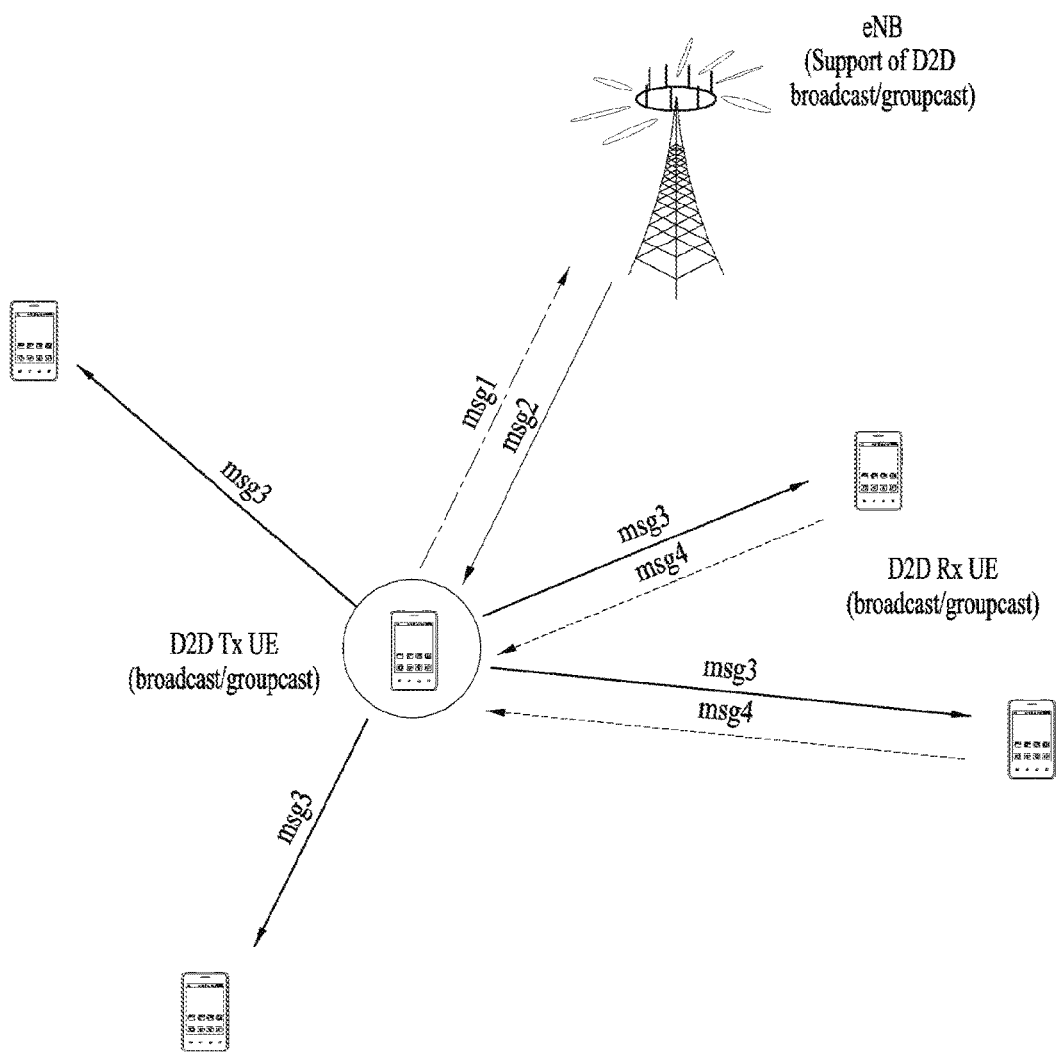
FIGS. 9 and 10 illustrate D2D communication performed through a pseudo-random access procedure according to an embodiment of the present invention.
Figure 10:
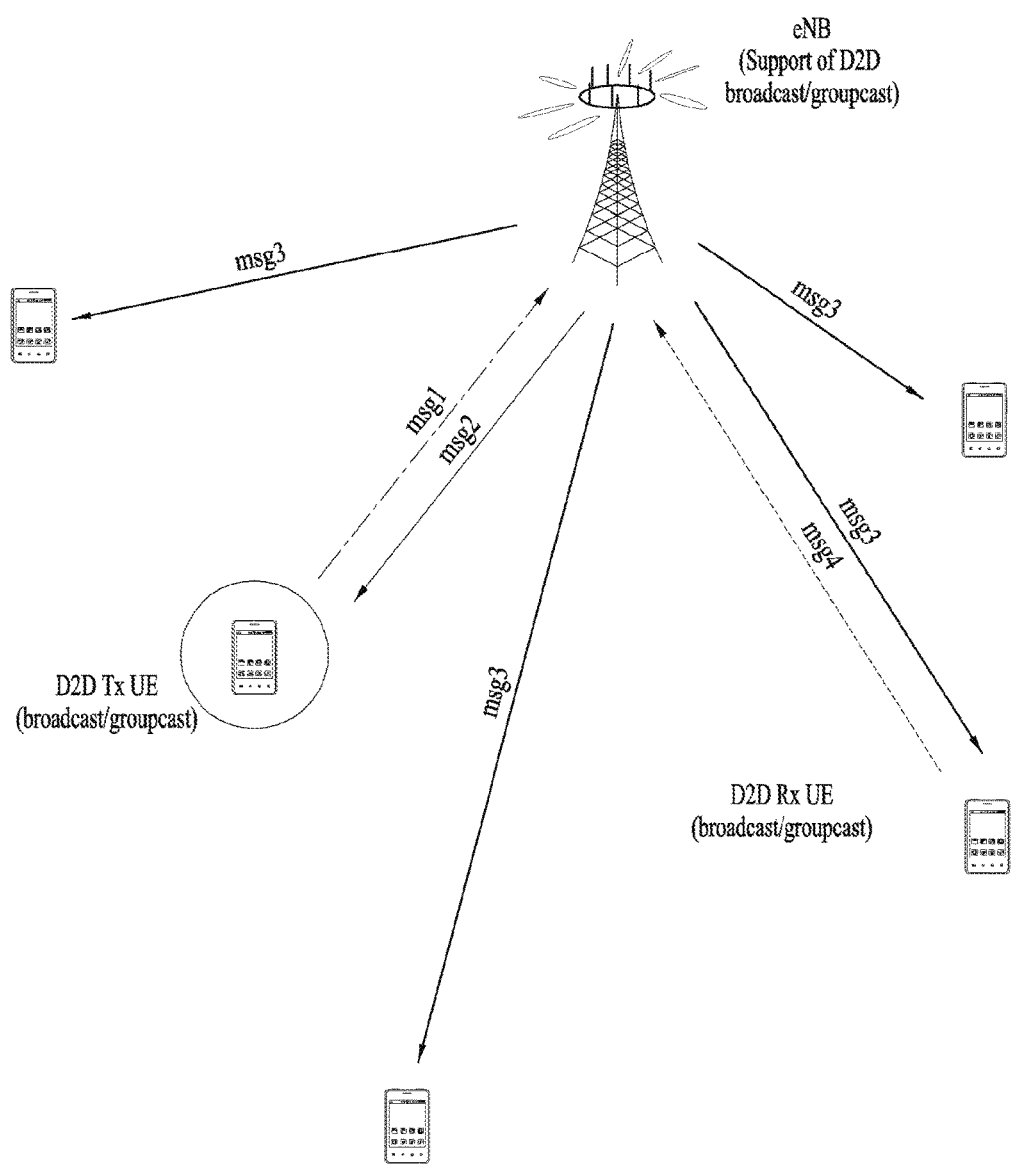

FIGS. 9 and 10 illustrate D2D communication performed through a pseudo-random access procedure according to an embodiment of the present invention.

In FIGS. 9 and 10, a Tx UE may transmit, to an eNB, msg1 thereof similar to a random access preamble in a preconfigured resource interval to initiate D2D communication. The eNB receiving msg1 of the Tx UE may be a serving eNB providing a service to the Tx UE, and may support D2D communication broadcast/groupcast of the Tx UE.

In FIGS. 9 and 10, the eNB may transmit msg2 containing information about, for example, resource assignment for transmission of msg3 of the Tx UE to the Tx UE in response to msg1.

In the example illustrated in FIG. 9, the Tx UE receives msg2 and transmits msg3 to Rx UEs of a predetermined group. That is, in the example of FIG. 9, the Tx UE may directly deliver msg3 to Rx UEs using resources assigned through msg2, without intervention of the eNB. When necessary, the Rx UEs receiving msg3 may deliver msg4 to the Tx UE to signal whether or not reception of msg3 is successful.

Contrary to FIG. 9, FIG. 10 illustrates an exemplary case where a serving eNB in place of the TX UE transmits msg3 to a predetermined Rx UE group. When necessary, the Rx UEs receiving msg3 may deliver msg4 to the eNB to signal whether or not reception of msg3 is successful.

Figure 11:
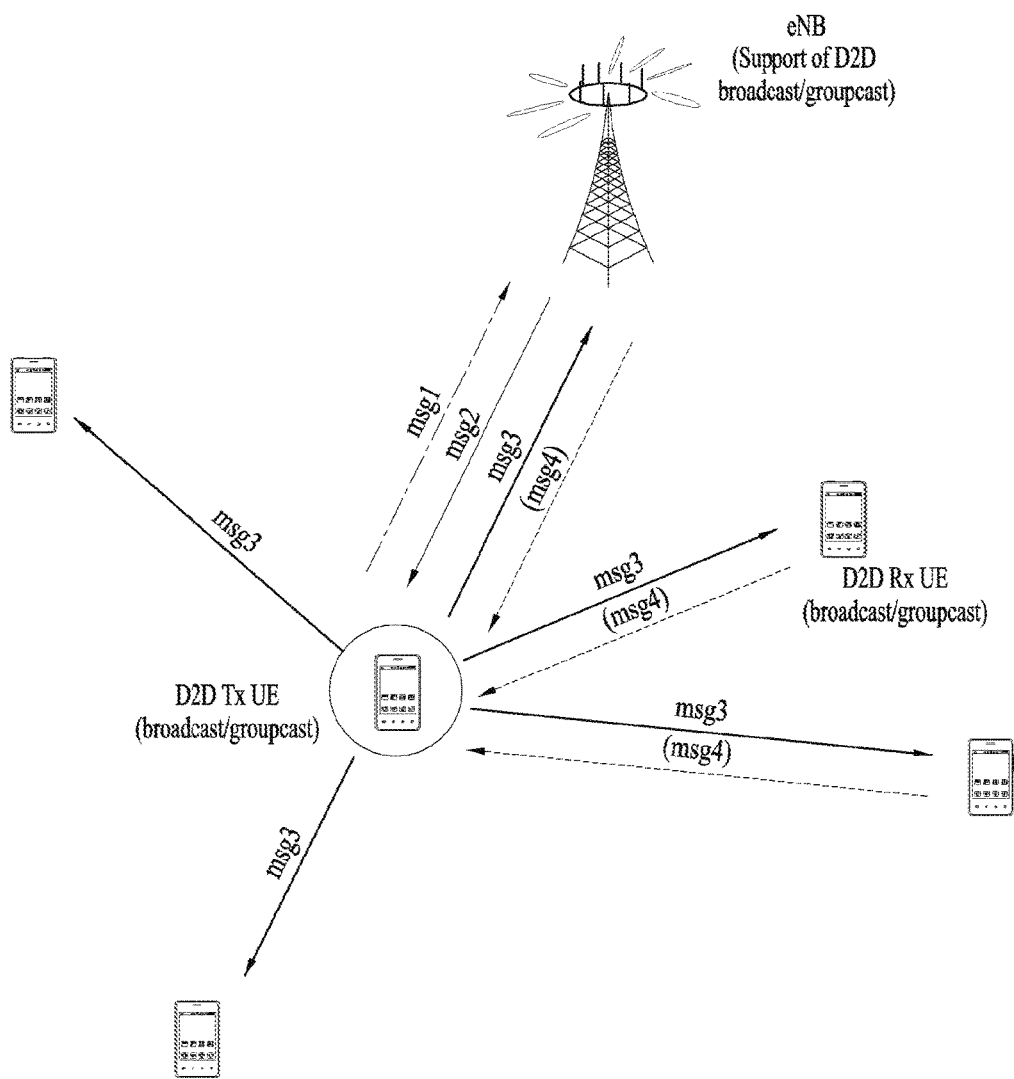
FIG. 11 illustrates D2D communication performed through a pseudo-random access procedure according to another embodiment of the present invention.

FIG. 11 illustrates D2D communication performed through a pseudo-random access procedure according to another embodiment of the present invention.

Similar to FIG. 9, FIG. 11 illustrates an example of direct transmission of a broadcast/groupcast signal from a Tx UE. In the example of FIG. 11, the serving eNB also receives msg3 transmitted by the Tx UE, and transmits msg4 as necessary. As the eNB receives msg3, not only the Tx UE but also the eNB may become subjects to perform retransmission according to a HARQ retransmission request, as will be described later.

Figure 12:
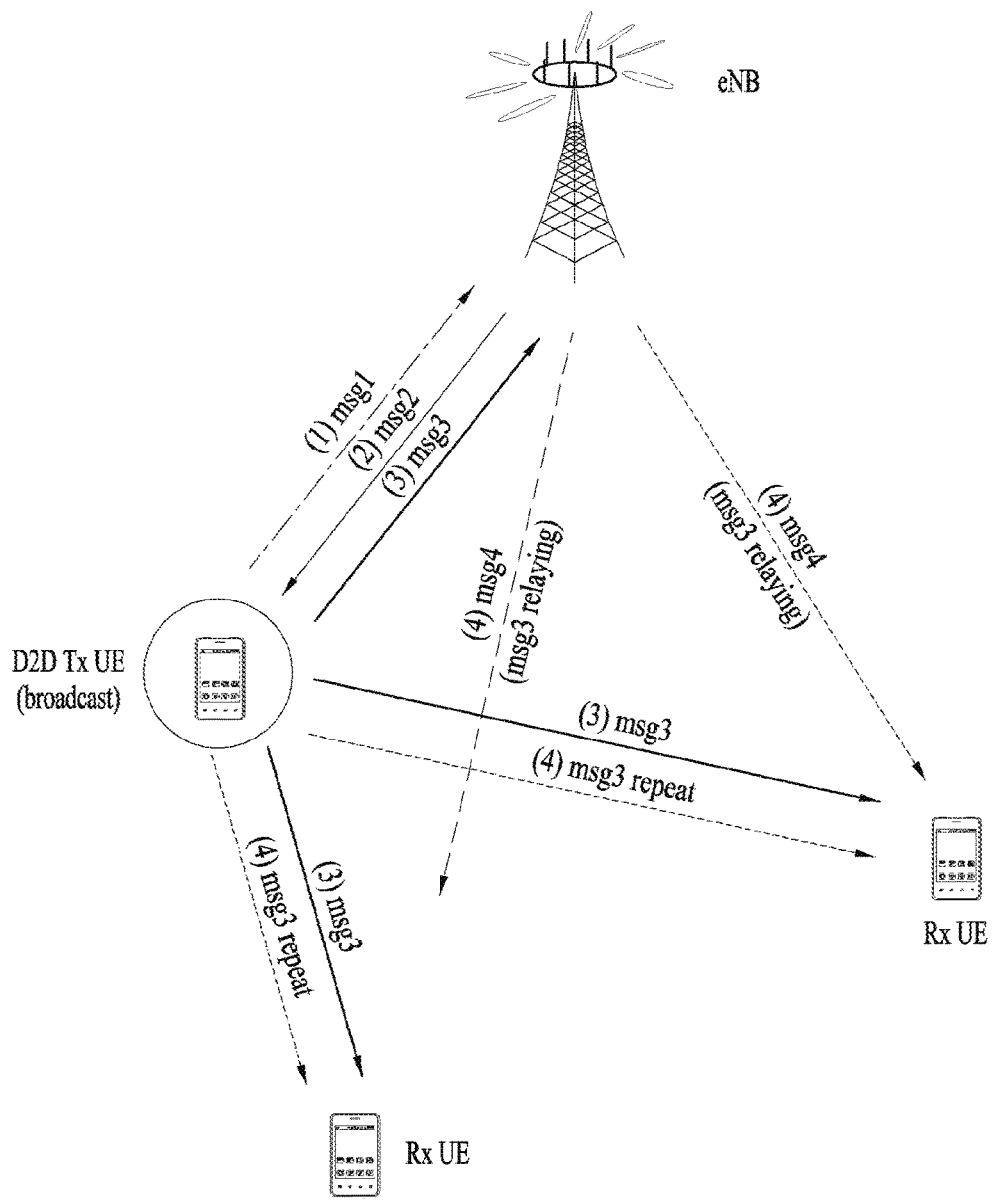
FIG. 12 illustrates a scheme in which a Tx UE and an eNB transmit a broadcast/groupcast signal (msg3) together or selectively.

FIG. 12 illustrates a scheme in which a Tx UE and an eNB transmit a broadcast/groupcast signal (msg3) together or selectively. That is, the eNB may transmit msg3 of the Tx UE in a relay manner such that Rx UEs combine signals from two paths. According to this message, after broadcast/groupcast signal information is pre-delivered to or pre-overheard by the eNB, not only the D2D Tx UE but also the eNB may transmit the broadcast/groupcast signal such that the Rx UEs can combine the signal from the D2D Tx UE with the signal from the eNB. While FIG. 12 illustrates that the eNB relays the signal of the Tx UE, the relaying operation may be performed by a device other than the eNB.

When the example of FIG. 12 is viewed in terms of time, the time at which the Tx UE broadcasts msg3 is preferably set to be different from the time at which the eNB transmits msg4. In the example of FIG. 9, after the Tx UE transmits msg3 as described above, the eNB relays msg4 including msg3 to the Rx UEs. The Tx UE may repeat transmission of msg3 at a corresponding time.

In TDD, DL transmission and UL transmission employ the same frequency and are distinguished from each other by times thereof. In the TDD system, when both the Tx UE and the eNB perform transmission at the transmission time of msg3, it is very difficult to implement a procedure in which the eNB receives msg3 from the Tx UE while transmitting msg3, and it is not preferable to design an operation which is difficult to implement. However, in the TDD system, it is possible to implement transmissions such that the transmissions are not performed simultaneously. Accordingly, it is sufficiently possible to receive and store signals transmitted at different times and increase a coding gain through Chase combining or incremental redundancy of the signals. In this context, the purposes of delivering a broadcast message to the Rx UE and delivering the msg3 message/content to the eNB (on behalf of relay broadcast) may be achieved simultaneously through one transmission of msg3.

In FDD, on the other hand, DL transmission and UL transmission are performed using different frequencies. Accordingly, time design is less restricted as the D2D Tx UE may use a D2D UL spectrum and the eNB may use a DL spectrum. Further, the eNB is capable of relaying msg3 while receiving msg3 from the D2D Tx UE. Accordingly, in designing operation times, FDD may reduce latency compared to TDD.

The D2D Tx UE may transmit msg3 when the eNB transmits msg4. In this case, signals transmitted from different transmission entities are combined and received at the same frequency in view of the D2D Rx UE, and accordingly a signal combination gain may be obtained. To this end, transmission of signals in the same format may be applied, superposition coding may be applied, or both methods may be applied in combination.

The function of msg4 illustrated in this example may be different from that of msg4 for another example. If the Tx UE views msg4 as a response to msg3, the msg4 reception time of the Tx UE (when the time for D2D msg4 is predetermined like the transmission/reception time of RACH message 4) may need to differ from the time of transmission of msg4 including msg3 of the eNB. After the eNB confirms that the eNB has safely received msg3 from the Tx UE (the original purpose of D2D msg4: msg4 in another example), the eNB may need to perform transmission at a transmission time of specific msg4 (a new msg4 signal designed to have the same format as that of msg3 or to include content of msg3) determined according to a predefined rule. Accordingly, msg4 illustrated as being delivered to the Rx UE along with msg3 of the Tx UE may be referred to as msg5 so as to be distinguished from msg4 of another example.

Herein, if msg5 in the same format as msg3 is relayed and repeated, the Tx UE may transmit msg3 at the same time as shown in FIG. 9, thereby increasing a gain. If msg5 having a different format from msg3 is transmitted, the same combining gain is expected to be obtained when the Tx UE generates and transmits msg5 in the same format. Herein, transmission may be repeated several times in consideration of paging and a discontinuous reception (DRX) period of the Rx UE. Thereby, the Rx UE may be allowed to receive the broadcast signal at least once when the Rx UE switches from the sleep mode.

While a broadcast/groupcast signal is generated by the Tx UE, it may be the eNB that actually delivers the signal to the Rx UEs. That is, the eNB may receive information to be broadcast from the D2D Tx UE through msg3, and directly broadcast/groupcast the same to the Rx UEs. In this case, the Tx UE obtains a gain in reducing power consumption. To more efficiently assign the eNB with transmission of msg3, msg1 may be sent along with a broadcast message.

Hereinafter, specific examples will be given based on the description given above. First, description will be given of a case where msg4 is necessary and a case where msg4 is unnecessary.

Figure 13:
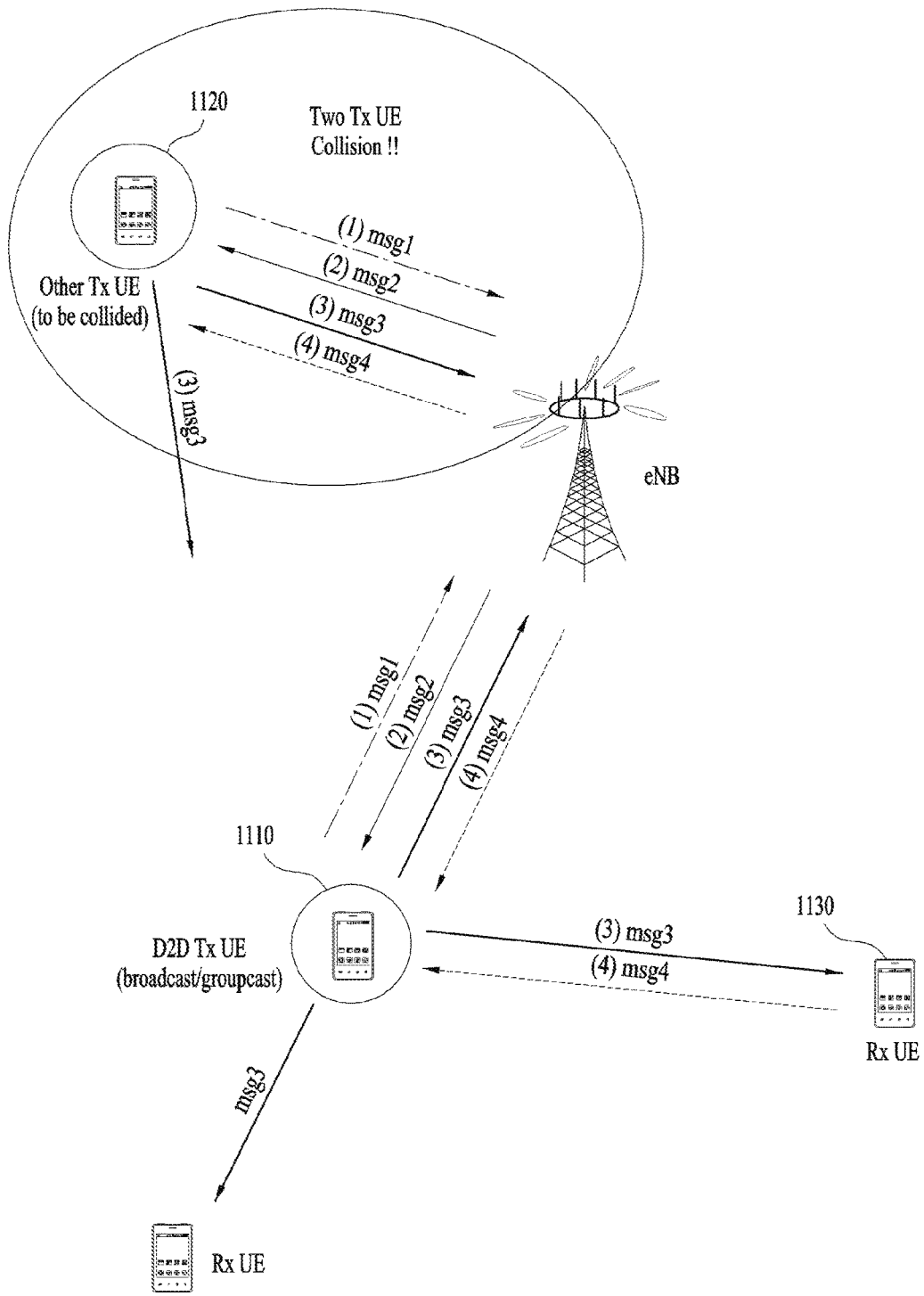
FIG. 13 illustrates a situation wherein collision occurs between two or more UEs as the UEs attempt to perform broadcast simultaneously, according to an embodiment of the present invention.

FIG. 13 illustrates a situation wherein collision occurs between two or more UEs as the UEs attempt to perform broadcast simultaneously, according to an embodiment of the present invention.

Specifically, a first D2D Tx UE 1110 and a second D2D Tx UE 1120 may transmit msg1 to msg4 according to a pseudo-random access procedure to initiate D2D broadcast to the eNB. Msg1 transmitted by the first D2D Tx UE 1110 and msg1 transmitted by the second D2D Tx UE 1120 may be designed not to be distinguished by the Tx UE as in the case of the random access preamble in LTE but to be distinguished by the transmission time and frequency of msg1. In this case, the eNB may transmit msg2 without distinguishing between msg1s. Thereby, collision may occur. Such collision may be addressed by exchanging msg3 and msg4 with the eNB as in LTE. In addition, in this embodiment, it is assumed that collision can be resolved not only through the contention resolution procedure performed with the eNB but also through transmission of msg4 of the Rx UE. That is, it is proposed that an Rx UE 1130 recognizing collision between broadcast signals from two or more Tx UEs transmit msg4 to resolve collision.

Hereinafter, a detailed description will be given of configurations of msg1 to msg4 in D2D communication employing the pseudo-random access procedure.

Msg 1

According to embodiments of the present invention, it is proposed that a Tx UE randomly select a signature from among predetermined signatures received through system information as in the case of the random access preamble of LTE and transmit msg1 through a resource randomly selected from among predetermined time-frequency resources.

The system information for msg1 for D2D communication may have a form similar to PRACH of LTE as shown below. For simplicity, this information will be referred to as D2D-PRACH configuration information, but it may also be assigned other names.

TABLE 1

D2D-PRACH-Config information elements

```
D2D-PRACH-ConfigSIB ::=         SEQUENCE {
    rootSequenceIndex               INTEGER (0..A),
    D2d-prach-ConfigInfo            d2d-PRACH-ConfigInfo
}
d2d-PRACH-Config ::=            SEQUENCE {
    rootSequenceIndex               INTEGER (0..A),
    d2d-prach-ConfigInfo            d2d-PRACH-ConfigInfo
              OPTIONAL    -- Need ON
}
D2d-PRACH-ConfigSCell-r10 ::=   SEQUENCE {
    D2d-prach-ConfigIndex-r10       INTEGER (0..B)
}
D2d-PRACH-ConfigInfo ::=        SEQUENCE {
    D2d-prach-ConfigIndex           INTEGER (0..B),
    highSpeedFlag                   BOOLEAN,
    zeroCorrelationZoneConfig       INTEGER (0..C),
    D2d-prach-FreqOffset            INTEGER (0..D)
}
-- ASN1STOP
```

In the system information above, the value A of rootSequenceIndex, the value B of physical configuration, the value C of zeroCorrelationZone, and the frequency offset value D may be set to any values as necessary. In addition, this embodiment is simply illustrative, and it is possible to omit a part of the system information.

Msg 2—(Function of msg2 as a scheduling command)

Two cases are described below on the assumption that a command for normal scheduling may be different from a scheduling command for (emergency) broadcast. Even if the same scheduling format is given, each field may have a different meaning or be differently interpreted according to the purpose thereof. Decoding may be attempted first and then an indicator field (e.g., a 1-bit field) for distinguishing between (emergency) broadcast and normal scheduling may be provided in the corresponding field.

A. Content of a msg2 Scheduling Command for Broadcast/Groupcast (Very simplified) resource allocation information
(Very simplified or truncated) modulation and coding scheme (MCS)
Hopping flag
Priority indicator (for an emergency situation)
Power control command (or fixed/maximum power value (configurable value) as will described later)
Timing lapse or partial time lapse information
In-band emission information, when necessary
UE ID-based processing
Groupcast HARQ information
Priority counting information (fairness information)
Other field(s)

B. Content of a msg2 Scheduling Command for Normal Scheduling (Very simplified) resource allocation information
(Very simplified or truncated) MCS
Hopping flag
Priority indicator (for an emergency situation)
Power control command (or fixed/maximum power value (configurable value) as will described later)
Timing lapse or partial time lapse information
In-band emission information, when necessary
UE ID-based processing Groupcast HARQ information Priority counting information (fairness information)

Other field(s)

If a random access response (RAR)-based RACH scheduling command of the legacy RACH procedure is used, the following fields may be formed to serve other purposes.

20-bit UL Grant (Random Access Response Grant)

Hopping flag-1 bit

Allocation of a resource block having a fixed size-10 bits

Truncated MCS-4 bits

Transmit power control (TPC) command for PUSCH transmission-3 bits

UL delay-1 bit

CSI request-1 bit

The 1-bit CSI request is intended for D2D broadcast and is substantially unlikely to be used. Accordingly, the CSI request may be set to a specific bit and a coding gain may be obtained using the bit as a virtual coding bit. Alternatively, the CSI request may be used as an indicator for distinguishing between (emergency) broadcast and groupcast as described above. For example, the bit may be configured as follows.

Bit state "A": (Emergency) broadcast/groupcast scheduling grant

Bit state "B": Normal scheduling grant

Msg3 and msg4

As described in the aforementioned operation, msg3 and msg4 may substantially correspond to a message that the Tx UE intends to deliver through broadcast and a corresponding acknowledgment, respectively.

In the case of LTE RACH, a UE having performed initial transmission of msg1 is designed to monitor msg2 and transmit corresponding msg3. According to the method of this embodiment, msg3 is intended to be broadcast to Rx UEs, and therefore the Rx UEs will not receive msg1, nor will the Rx UEs attempt to monitor msg2. Furthermore, the Rx UEs may not know the fact that the Tx UE has sent msg3, nor attempt to monitor and receive msg3. In particular, the Rx UEs should receive msg3, which is usually transmitted by a UE.

Accordingly, in order to receive msg3, a special action is to be taken in advance. In particular, information for decoding and demodulating msg3 is necessary. For this reason, it is preferable for the Rx UEs to receive msg2, which serves to approve scheduling of msg3. That is, it is preferable to deliver, to the Rx UEs, information capable of executing decoding and demodulation of msg3 (resource allocation, MCS, HARQ, transmission time, timing lapse, CP length, emergency indicator, hopping indicator, priority indicator, number of msg3 transmissions, retransmission timing, a HARQ response method, etc.) through msg2. In addition, before the msg2 and information for decoding and demodulation are delivered, the Rx UEs need to receive msg2. Accordingly, it is preferable to pre-signal information about a time at which msg2 is transmitted or is likely to be transmitted, RNTI-related information (e.g., RA-RNTI for demasking PDCCH for msg2 if the PDCCH is masked with an RNTI, a range of RNTI values reserved for a D2D Tx UE or a certain allocated value), a Tx UE ID (when necessary), and information about msg1 of the Tx UE (e.g., a time-frequency resource index, a subframe, a radio frame, a UE ID, an IMSI), particularly, information used in scrambling and masking msg2.

Alternatively, information (a fixed or determined value) about a subframe in which MSG2 is transmitted may be pre-signaled to the Rx UEs in a broadcast manner, and a subframe or a radio frame configured in this way may need to be persistently monitored to decode and demodulate msg3.

When msg3 is delivered via a relay, the delivered msg3 is likely to take the form of msg4. Accordingly, the Rx UE persistently performs monitoring at the msg4 delivery time to decode and demodulate msg4 (having a format including msg3 information or including a case where msg3 itself is transmitted) so as to finally obtain a broadcast message.

Alternatively, if msg4 is transmitted in the same format as msg3, this transmission may be considered as retransmission or repetitive transmission of msg3 rather than transmission of msg4.

Next, if msg2 is received, it is assumed that msg3 has been normally transmitted. Msg3 may be delivered from a Tx UE to an eNB and Rx UEs. Once the eNB receives msg3, the eNB may deliver msg4 to the Tx UE to signal whether or not reception is successful. Similarly, in the case of groupcast, Rx UEs receiving msg3 may transmit msg4 (wherein msg4 is a message delivered to the Tx UE by the Rx UEs and may be identical to or different from a message which is delivered to the Tx UE by the eNB) to signal whether or not reception is successful. In the case of broadcast, the Rx UEs may not perform msg4 transmission. Alternatively, the Rx UEs may deliver, to the eNB, information indicating whether or not reception of msg4 is successful, and the eNB may collect the information and deliver the same to the Tx UE. In this method, it is assumed that the eNB is capable of receiving signals from all Rx UEs relatively well. In this case, the eNB may become a device to finally determine whether or not msg3 is received. If msg3 is not properly delivered, the eNB may re-schedule msg2 such that msg3 transmission is attempted.

As another issue, if there is no response to transmitted msg3, this case is analyzed. No response is provided, namely the Tx UE does not receive msg4 for two major reasons: one reason may be that msg4 sent by the eNB is not capable of decoding the PDCCH, and the other one may be that the PDSCH is not decoded or demodulated.

(1) Error in PDCCH (PDCCH Detection Failure)

Although a PDCCH for msg4 is monitored, the PDCCH (hereinafter, referred to as msg4 PDCCH) may not be detected. This is the case where a msg3 fails to be received. Failure of reception of msg3 may occur in two cases. In one case, msg3 may not be properly received when msg3 collision occurs (e.g., when one or more Tx UEs transmit MSG 1, receive a msg2 response simultaneously, and then transmit msg3 respectively). In the other case, msg3 is not properly received as the radio channel for msg3 transmission is not good. A simple method to address this issue is to restart the failed D2D broadcast transmission procedure with msg1. Of course, in this procedure, previously received parameters and corresponding values may be reused.

Alternatively, values of the parameters may be increased to a certain degree. For example, transmit power of msg1 may be increased from the existing value. Alternatively, when transmission of msg1 is successful, scheduling may be attempted by setting a TPC command value for a msg2 scheduling grant to a higher value.

Alternatively, if there is no response to msg4, msg1 may be skipped and a msg3 scheduling grant may be received again by monitoring msg2 in agreed subframe(s) (subframe(s) agreed to be recognized in this situation) in which msg2 is transmitted.

It is also possible to eliminate msg4 and simply broadcast msg3. Msg4 is designed to be used for HARQ operation for msg3 and RRC connection completion or confirmation.

However, if broadcasting is performed in D2D communication, a response may not be necessary, and thus msg4 may not be necessary. In particular, operations may be normally performed outside network coverage without msg4.

(2) Error in PDSCH (PDSCH Demodulation Failure)

If detection of msg4 PDCCH is successful, this means that msg3 has been normally received in the previous process. Accordingly, msg4 PDCCH may have been transmitted. However, there may be an error in the PDSCH and thus it may not be possible to demodulate the PDSCH. This case corresponds to an error situation in the HARQ operation. The normal HARQ operation would transmit negative acknowledgment (NACK). However, in D2D broadcast, it may not be necessary to retransmit msg3 in contrast with the case of the legacy RACH. If retransmission is needed, the retransmission may be performed by transmitting, via msg2, a scheduling grant for the retransmission, or a Tx UE may perform the retransmission using pre-designated scheduling grant information.

When two or more Tx UEs transmit msg3, msg3 transmitted by one of the Tx UEs may be detected and successfully demodulated by the eNB. In this case, msg4 response may be delivered to the Tx UE having successfully transmitted msg3. Then, the eNB having successfully received msg3 may respond to the Tx UE using msg4 for announcing whether or not reception of the broadcast message is successful. Then, the Tx UE terminates the broadcast transmission procedure. However, a Tx UE receiving msg4 response which is not directed thereto, the Tx UE preferably returns to the msg1 transmission operation. Since even the eNB does not know which Tx UE has transmitted a broadcast, a msg2 scheduling grant for msg3 cannot be generated. This contention resolution procedure is performed using RACH msg4. In this case, if a Tx UE receiving msg4 determines that msg4 does not have the UE ID of the Tx UE, transmission of msg1 is performed.

A D2D Rx UE may not only receive a D2D broadcast but also maintain connection with the eNB. Accordingly, the D2D Rx UE may receive scheduling of PDSCH from the eNB over the PDCCH/EPDCCH. In this case, the Rx UE needs to determine whether to receive D2D broadcast msg3 (which is or is not relayed) and whether to receive a normal PDSCH from the eNB.

If possible, the Rx UE may receive and process both D2D broadcast msg3 and the normal PDSCH. However, if the Rx UE determines that it is preferable to receive one of D2D broadcast msg3 and the normal PDSCH (particularly, in the same carrier, the same band or the same spectrum), it is better to receive relayed D2D broadcast msg3. Considering that a broadcast message is an unusual signal, a reception priority is preferably assigned to the D2D link.

However, in a situation wherein carrier 1 maintains eNB-UE communication connection and carrier 2 maintains D2D communication connection when multiple carriers are provided, if D2D broadcast msg3 relayed through carrier 2 is transmitted, it is preferable to receive D2D broadcast msg3 along with a PDSCH scheduled using carrier 1 at the same time.

For reference, the legacy RACH operation is described below.

In the LTE RACH operation, if a UE is assigned an RA-RNTI and a C-RNTI or semi-persistent scheduling (SPS)C-RNTI (SPS-C-RNTI or SPC-RNTI) in the same subframe, and is not configured by a plurality of timing lapse groups, the UE need not decode a PDSCH indicated by a PDCCH having cyclic redundancy check (CRC) scrambled with the C-RNTI or SPS-RNTI.

TABLE 2

| DCI format | Search Space | Transmission scheme of PDSCH corresponding to PDCCH |
|---|---|---|
| DCI format 1C | Common | If the number of PBCH antenna ports is one, Single-antenna port, port 0 is used (see 3GPP TS 36.211 Rel-8/Rel-9 subclause 7.1.1), otherwise Transmit diversity (see 3GPP TS 36.211 Rel-8/Rel-9 subclause 7.1.2) |
| DCI format 1A | Common | If the number of PBCH antenna ports is one, Single-antenna port, port 0 is used (see 3GPP TS 36.211 Rel-8/Rel-9 subclause 7.1.1), otherwise Transmit diversity (see 3GPP TS 36.211 Rel-8/Rel-9 subclause 7.1.2) |

Herein, when it is assumed that the RA-RNTI is used for D2D broadcast in contrast with conventional cases, only the RA-RNTI needs to be decoded even if a C-RNTI and an SPS C-RNTI are detected along with the RA-RNTI. Accordingly, the UE may not expect the C-RNTI and the SPS C-RNTI to be received, and operate on the assumption that neither the C-RNTI nor the SPS C-RNTI is transmitted.

If broadcast and groupcast are performed by introducing a new RNTI such as a D2D RNTI to the D2D broadcast in place of the RA-RNTI, it may be compulsorily assumed that there is no PDSCH scheduled with the C-RNTI and the SPS C-RNTI other than the D2D RNTI.

Since relayed msg3 is not restricted to a specific decoding time, the relayed msg3 may be stored when received and then decoded when decoding is allowed. The D2D RNTI may be received upon receiving the C-RNTI and the SPS C-RNTI. Then, the C-RNTI, the SPS C-RNTI and the D2D RNTI may be sequentially decoded according to levels of emergency or priorities thereof Although msg4 has been discussed above, the D2D link should be prioritized in view of a D2D Tx UE receiving msg2 (e.g., a grant for broadcast msg3 scheduling) in performing the D2D operation. Accordingly, a link for delivering D2D msg2 such as a D2D RA-RNTI or a new D2D RNTI should be preferentially received. That is, an operation may be performed such that presence of a PDSCH scheduled with the C-RNTI or the SPS C-RNTI is not expected in the same subframe.

While D2D broadcast has been mainly discussed above, the proposed techniques may be applied not only to groupcast but also to unicast.

<In the Case of Groupcast>

According to one embodiment of the present invention, HARQ ACK/NACK for groupcast may be additionally designed. In particular, the groupcast UE may manage group members through HARQ ACK/NACK for transmitted msg3 in contrast with the broadcast UE.

Accordingly, for groupcast, msg4 is preferably delivered to the Tx UE. However, if there is a subject capable of performing retransmission of the Tx UE, msg4 may be delivered to the subject rather than to the Tx UE to receive a retransmission packet. For example, the service may be the eNB. Alternatively, other relay UEs neighboring the Tx UE may perform the retransmission in place of the Tx UE. Of course, if there is no such intermediate subject, msg4 is preferably delivered to the Tx UE.

Delivery to the Tx UE may be implemented through either direct delivery to the Tx UE or indirect delivery to the Tx UE. It may also be possible to signal, to the Tx UE, presence or absence of an error and whether to perform retransmission via the eNB or other D2D UEs.

For broadcast, it may be more preferable to not feed back whether or not the received message has an error. Since the message is delivered to multiple unspecified UEs, it may not be necessary to know if some of the unspecified UEs have not properly received the message.

More specifically, if Rx UEs have successfully received msg3, it may not be necessary to transmit msg3 relayed by the eNB. If some Rx UEs have failed to receive msg3, transmitting msg3 relayed by the eNB may be helpful. This information may be needed for the eNB to perform retransmission, and may be obtained from the Tx UE. Alternatively, the eNB may directly receive feedback from the Rx UEs and determine whether or not to perform retransmission. For example, when the Tx UE transmits msg3, some UEs successfully receive msg3, but the other UEs are likely to fail to receive msg3. The UEs which have failed to receive msg3 may transmit msg4 directly to the Tx UE to announce whether reception was successful or failed. Alternatively, if the UEs are aware of presence of the eNB and come to know that the eNB will participate in retransmission as a relay, the UEs will deliver msg4 back to the eNB as a response. Msg4 received from the Rx UEs may substantially correspond to HARQ ACK/NACK information, which forms the basis of signaling whether or not msg3 information has been received in the group.

If only the Tx UE has overheard msg4 ACK/NACK, a procedure of signaling this fact to the eNB is required. In this case, if there is a connection between the eNB and the Tx UE, the corresponding information may be delivered through a higher layer signal or through MAC or physical signaling.

However, this operation takes a certain latency. Such a delay may significantly affect system efficiency in some cases. Accordingly, to attenuate the delay, the eNB may be set to directly receive msg4 ACK/NACK from the Rx UEs. Thereby, the eNB may naturally use statistics of the received ACK/NACK or individual pieces of ACK/NACK feedback information to determine whether or not to perform retransmission and a retransmission method.

In the case where individual UEs are controlled, retransmission may be attempted for respective UEs, or acknowledgments may be taken all at once for a group of UEs. In the latter case, when the statistics of ACK/NACK of the group UE indicate that more than P_AN % of ACK/NACK is ACK, retransmission may not be performed, but next transmission may be attempted on the assumption that all the UEs have received information. On the other hand, if P_AN % or less of ACK/NACK is ACK, a specific threshold may be introduced to cause retransmission to be re-attempted. Alternatively, only UE(s) having failed to receive the message may transmit NACK, and the NACK(s) transmitted by the UE(s) having failed to receive the message may be soft-combined such that NACK(s) are received by the D2D Tx UE and/or the eNB. Thereby, the number of UEs having failed to receive msg3 may be estimated based on the strengths or energy of signals of NACK, and whether or not to perform retransmission and the retransmission method may be determined based on the estimation. The eNB may determine whether or not to perform retransmission based on the information received from the Tx UE, and then perform transmission of msg3 according to the determination.

If the eNB directly receives a feedback indicating whether or not reception of msg3 is successful from the Rx UEs through msg4, the eNB may determine whether or not to perform retransmission based on msg4 received from the Rx UEs, and then retransmit msg3 to the Rx UEs according to the determination.

Herein, when the feedback information directed to the eNB is transmitted, ACK/NACK may basically use the PDCCH resources. However, if the situation requires that PUCCH transmission and PUSCH transmission be performed simultaneously, ACK/NACK may piggyback on the PUSCH in consideration of PUSCH transmission. For the PDCCH resources, a separate PUCCH resource region may be assigned and operated, and assignment of individual PDCCH resources may be dynamically selected and used with linkage to msg3 transmission resources. The start position of the resource region may be pre-designated by applying Npucch offset, and a new start position may be determined in every subframe by linking the resources to, for example, the positions of msg3 transmission resources (resource block (RB) indexes, RB and subframe indexes, or UE ID, RB and subframe indexes, etc.) (e.g., PDCCH CCE-to-PUCCH index linkage).

Alternatively, the start position of the resource region may be determined with linkage to msg2 group RNTI and/or RAR index.

A resource for transmitting ACK/NACK through msg4 PDCCH may be determined by mapping the resource to a UE ID, a msg2 RNTI, a msg2 RAR index, a msg2 PDSCH RB position and/or msg4 RB position. In this case, individual resource assignment for msg4 transmission may be skipped.

As described above, the proposed methods are applicable not only to an RRC connected UE but also to an RRC idle UE. This is because the RRC idle UE also needs to be allowed to participate in transmission/reception of a D2D broadcast signal in case of emergency.

According to the current standard, the idle UE cannot deliver, specifically, broadcast information without an RRC connection. Accordingly, a separate D2D mode is established and the RRC idle UE is not allowed to perform broadcast so long as broadcast is not intended. Accordingly, to perform an RRC connection procedure which should be implemented for the RRC idle UE to perform broadcast according to the current standard, an RACH procedure needs to be pre-performed.

In this sense, performing broadcast transmission in the middle of the RACH procedure without completing the RRC connection procedure may be advantageous in terms of delay. Accordingly, in one embodiment of the present invention, it is proposed that the RRC idle UE employ a pseudo-random access procedure to perform broadcast before completing the RRC connection procedure. As a simple example, it is proposed that msg3 be used for transmission of a broadcast signal immediately after the Tx UE transmits msg1 and receives msg2 from the eNB.

Unless stated otherwise in the following description, the procedure for implementing broadcast of the RRC idle UE may employ all the procedures illustrated in FIGS. 9 to 13.

A D2D Tx UE having content to broadcast/groupcast for a reason such as an emergency situation or for group communication may transmit msg1 to the eNB. This message may be viewed as a signal requiring scheduling information which is needed to transmit a broadcast signal. The signal may have a different purpose/sequence configuration from the legacy preamble. In addition, to distinguish between the signal and the legacy preamble in the position of the eNB, a separate sequence, resource, and transmission pattern may be provided.

In another example of the present invention, msg2 may simply mean a grant for a resource request in msg1. For example, if a broadcast transmission resource, time and frequency are preconfigured or implicitly known (namely, if the broadcast transmission resource, time and frequency change according to msg1 information or are indicated by a UE ID, a preamble index, a transmission resource collision/index or a combination thereof), msg1 is transmitted and a grant is obtained from the eNB by receiving msg2. In addition, Rx UEs may receive a broadcast signal at positions of time and frequency resources which are preconfigured or implicitly known (wherein the time may include not only a subframe and a radio frame but also timing advance information).

As an example of implicit information for msg3, a broadcast signal for emergency or a special purpose may be transmitted invariably on specific time and frequency resources. Accordingly, when the eNB detects a signal on the corresponding resources, the eNB may take a corresponding action, considering that the detected signal is a broadcast signal for emergency or special purposes.

In another example of the present invention, msg2 is not a simple grant for the msg1 request in contrast with the previous example. In this example, msg2 may be used to deliver scheduling information necessary for transmission of msg3. Meanwhile, if RRC idle UEs do not know when to overhear msg3, a wakeup procedure such as paging may be introduced to signal when to overhear msg3. In this procedure, a candidate time, subframe and radio frame for monitoring a broadcast signal are signaled as paging of the D2D idle UE. That is, information about when to wake up and overhear msg3 is delivered.

Before msg3 is transmitted, the transmission should be indicated to all UEs. This operation may be recognized as additional paging different from conventional paging. Conventional paging determines when the UE should wake up and perform monitoring according to the UE ID and higher layer parameters. However, in the new paging of the this embodiment, a paging signal causing all UEs to monitor a specific resource at a specific time may be introduced on behalf of the D2D Rx UE which needs to overhear msg2. In order to make minimum changes to the legacy paging operation, paging may be maintained, while msg2 is transmitted several times to make sure that D2D Rx UEs which wake up at different times overhear msg2. Thereby, all Rx UEs may be provided with an opportunity to receive msg3 at least once. The period of transmission of the same content is preferably set such that the D2D Rx UEs which need to overhear msg2 overhear msg2 at least once. The accurate period may be differently set according to msg2 detection performance.

As an associated operation, msg3 may be transmitted every time msg2 is transmitted. Specifically, msg3 may be transmitted when a certain time passes after msg2 is transmitted. Alternatively, msg3 may be transmitted once per several transmissions of msg2. Herein, msg2 and msg3 need not have a one-to-one correspondence relationship but may have a many-to-one correspondence relationship. A temporal relationship may be established in various manners when t>0. The temporal relationship may be associated with the UE paging operation.

Reception of msg3 needs to be prioritized over other signals. If msg3 is an emergency signal and broadcast signal, reception of msg3 needs to be prioritized over transmission/reception of other signals in consideration of urgency of msg3. If UL transmission needs to be performed in a subframe in which msg3 should be received, transmission from the UE to the eNB may be implemented by skipping/dropping/delaying a corresponding channel.

If the eNB transmits a signal to a D2D UE at the corresponding time, transmission of the signal is preferably suspended since reception of msg3 is prioritized over transmission of the signal. In this case, a relevant transmission channel operation (e.g., HARQ) may be skipped or delayed. This skipping or delaying operation may occur in one or more subframes (a plurality of subframes) or a subframe group (or set), or periodically on the basis of a subframe group (or set) or subframes having an irregular periodic pattern.

Regarding msg2, basic transmission information of msg2 may include timing advance (TA), time/frequency assignment, and power ramping information. Herein, the TA information may be useful when a broadcast Rx UE estimates an approximate reception time. For example, if the UE having very high TA is a broadcast Tx UE, only subframe information is received without considering TA. If the UE attempts to perform reception based on the TA thereof or TA=0, the UE may not properly receive the broadcast signal due to timing misalignment. Accordingly, as the value of the TA increases, the importance of TA may also increase.

In this context, it is preferable to introduce a mechanism for signaling the degree of TA of the Tx UE to all Rx UEs. A TA value delivered through msg2 may be received and used for a future reception operation. That is, the Tx UE performs transmission and the Rx UEs performs reception according to a value obtained by correcting/considering TA.

When necessary, the CP length may be signaled such that the TX/Rx UEs use the CP length. For example, if a transmission resource for a broadcast signal is fixed to a pre-agreed value or the RA-RNTI is determined using RA_RNTI=1+t_id+10*f_id in D2D communication, and all broadcast/groupcast target UEs share t_id and f_id, msg2 may be decoded using the same RA_RNTI. Herein, t_id denotes the first subframe index of a specific PRACH (0≤t_id<10), and f_id denotes the index of a specific PRACH in a corresponding subframe in descending order in the frequency domain (0≤f_id<6).

As another example, the RA-RNTI may be determined in D2D in another way. Since content of msg2 is actually delivered over the PDSCH, it is not difficult to design msg2 to include information necessary or helpful for reception of a D2D broadcast signal. Basically, information about when a broadcast signal will be transmitted and information about a resource region in which the broadcast signal will be transmitted may be needed. UE POs and PFs are different as described above, and thus all idle UEs may not overhear the information simultaneously if the broadcast signal is transmitted only once. Accordingly, the same content of msg2 needs to be delivered N times for a specific time duration T such that all Rx UEs can overhear msg2.

Herein, even if msg2 has the same content, encapsulation of the delivered content may be differently configured. One thing that is different from the legacy operation is that UEs which have not transmitted msg1 should receive msg2. To this end, a separate requirement may be needed.

For groupcast, all group UEs may be required to receive msg2. Assuming that information necessary for broadcast and reception has been obtained from msg2, the Tx UE transmits a broadcast signal on pre-agreed time/frequency resources (which are known to all Rx UEs). Meanwhile, if msg1 is transmitted in a transmission region configured by the values of t_id and f_id, the UE attempts to perform reception using one RA_RNTI corresponding to t_id and f_id according to the legacy standard since there are one or more RA_RNTIs enabling reception of the msg2.

If there are multiple values of t_id and f_id and transmission is performed through multiple msg1 transmission regions (values reserved for msg1 for a broadcast signal), and msg2 is transmitted using multiple RA_RNTIs, it is proposed that the UE attempt to perform blind decoding of each of the RA_RNTIs to successfully receive msg2. With this method, multiple resource regions where msg1 may be transmitted may be secured, and thus flexibility of msg1 transmission may be enhanced. However, a large number of t_ids and f_ids may generate an excessively large number of RA_RNTIs, thereby increasing the ID value that the UE should monitor and in turn increasing complexity. Accordingly, to manage t_id and f_id at a proper level, a limited number of t_ids and f_ids are preferably provided. A few t_ids and f_ids may not significantly increase complexity in performing blind decoding.

To further simplify the above case, specific values of t_id and f_id may be set to have the same RA-RNTI. That is, even if transmission positions are different, an RAR message (msg2) may be obtained using one RA-RNTI if the positions are mapped onto one RA-RNTI in a preconfigured specific resource region.

When the above operations are applied to an RRC connected UE, some of the operations may be enhanced. It is also possible to cause the RRC connected UE to perform the same aforementioned operations as an RRC idle UE. This is the case of defining a new operation.

If the Tx UE is in the connected mode, the PRACH procedure may not be needed. That is, it may be assumed that at least DL synchronization and TA are tracked to some extent. In this case, the broadcast request may be used for a signal other tha msg1.

The most basic method is to transmit a scheduling request (SR). For the RRC connected UE, the signal may be considered as performing the function of msg1 for the idle UE. To satisfy the condition that all Rx UEs should overhear msg2, the signal is preferably transmitted in a common search space (CSS) as in the case of the RA-RNTI. In this case, an SR for a special resource and a corresponding broadcast-RNTI are required. Herein, characteristics of an SR resource are determined by a cyclic shift (CS) index and an orthogonal cover sequence (OCS) index. Accordingly, a specific index combination may be used for the SR resource.

Alternatively, the resource for SR transmission may be configured via a higher layer signal. The configurable resources may include all resources currently used for SR, or a specific RB may be configured as an RB for transmitting only a broadcast-SR, or a specific index range may be taken as indexes for transmitting broadcast-SR. When the SR resource corresponds to a normal CP and DELTA=1, only 36 index combinations configured by a symbol corresponding to spreading factor (SF) 3 and a symbol corresponding to spreading coefficient 4 are available due to the restriction of SF=3. This is because 12 combinations are not used among 48 combinations when SF=4. The 12 combinations may be defined and used for broadcast SR transmission.

Due to the SR resource that is specially determined as above, the eNB may create a special RNTI and transmit the same such that all Rx UEs can detect the RNTI. When the special RNTI is used, the Rx UEs are preferably aware of the RNTI. Monitoring the special RNTI in every subframe may be a burden to the UE. The D2D UEs may monitor the special RNTI alone in every subframe. In this case, monitoring needs to be performed so as not to increase load of blind decoding (BD).

Timing Relationship Between Msg2 and Msg3

Figure 14:
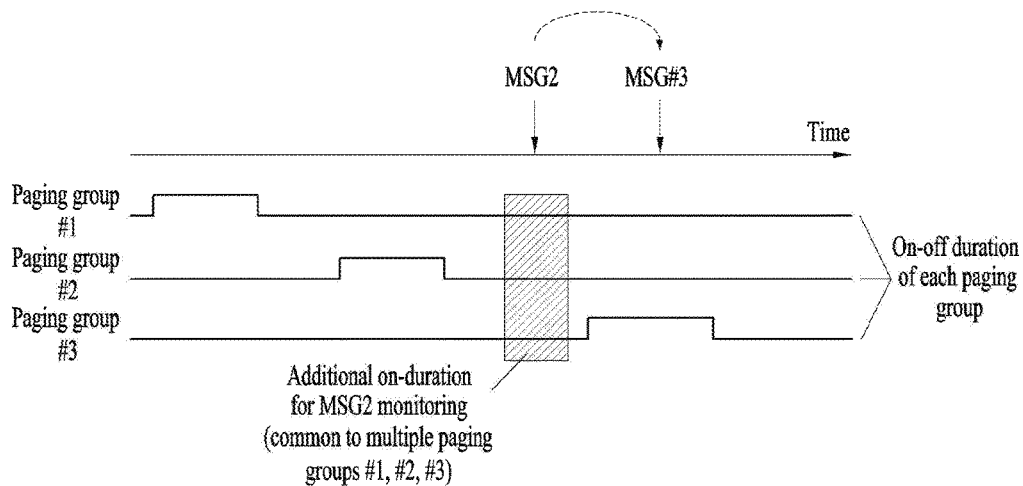
FIG. 14 illustrates a temporal relationship between msg2 transmission and msg3 transmission in consideration of a paging group according to an embodiment of the present invention.

FIG. 14 illustrates a temporal relationship between msg2 transmission and msg3 transmission in consideration of a paging group according to an embodiment of the present invention. In the example of FIG. 14, it is assumed that three different paging groups exist and have on-off periods at different times.

As a method to allow all Rx UEs to receive msg2 in this situation, all paping groups of the D2D Rx UE may be provided with a separate On duration to overhear msg2. In this case, necessary msg2 information may be delivered through only one transmission of msg2. Thereafter, among the UEs receiving the msg2 information, the Tx UE may transmit msg3 at a designated time and resource as indicated by msg2, and the other Rx UEs may receive msg3 at a designated time and resource indicated by msg2.

In this method, signaling for generating an additional period for overhearing msg2 is preferably defined. The UEs may be configured to return to the sleep/idle mode (in DRx) in an interval starting when msg2 is received and ending when msg3 is broadcast or received. However, if the interval is associated with msg2 reception time and msg3 transmission time (e.g., if there is an available resource after a designated time passes, the resource is transmitted) and the corresponding time is sufficiently short, the UEs may be continuously maintained in the on state. The UEs may utilize the interval between the two messages as a time for which the UE can prepare msg3 broadcast or reception, namely sufficiently maintain time and frequency synchronization.

Further, when the operation illustrated in FIG. 12 is performed, the Rx UEs need to receive msg4 from the eNB. Accordingly, a rule may be established such that the idle UEs having received msg2 switch to the On state at least before the time at which msg3 is transmitted or the time at which msg4 is transmitted and prepare to receive a corresponding signal. Of course, if reception of msg2 fails, the UEs may return to usual operations and skip all receptions during the Off duration to prevent battery power consumption.

Figure 15:
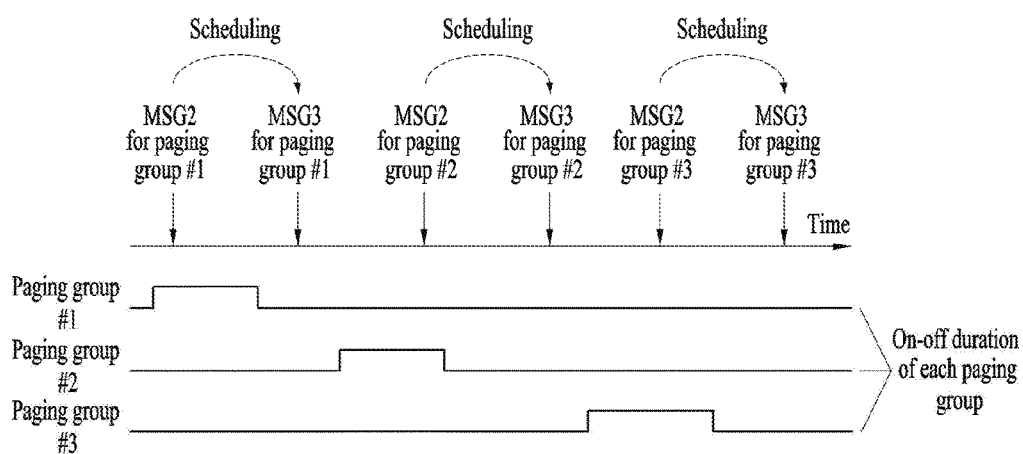
FIG. 15 illustrates an exemplary case where msg2 is transmitted in an On interval of a paging group of each UE and then msg3 is transmitted at a time designated by scheduling, according to another embodiment of the present invention.

FIG. 15 illustrates an exemplary case where msg2 is transmitted in an On interval of a paging group of each UE and then msg3 is transmitted at a time designated by scheduling, according to another embodiment of the present invention.

The basic assumption and method of the example described above in relation to FIG. 14 is equally applicable to the example of FIG. 15. In the example of FIG. 15, however, msg2 is transmitted several times for the On durations of paging groups. Herein, the transmission time of msg3 may be determined according to scheduling and be given in both the sleep mode and the wake-up mode. In addition, the transmission time of msg3 may be pre-designated according to a rule (transmission is performed after k time units), and may be adjusted according to the scheduling time/situation. Alternatively, a timer may be operated such that the message is transmitted within a certain time.

Figure 16:
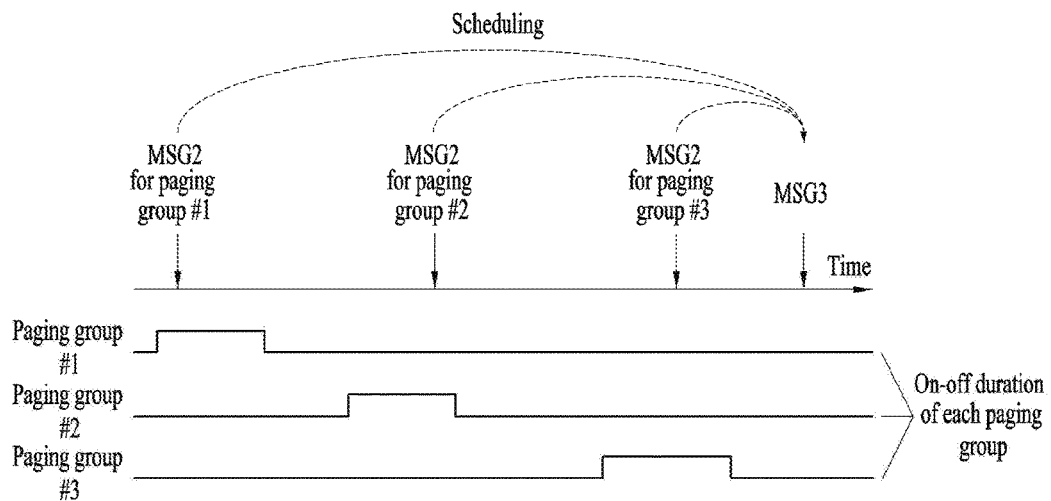
FIG. 16 illustrates a timing relationship between msg2 and msg3 according to another embodiment of the present invention.

FIG. 16 illustrates a timing relationship between msg2 and msg3 according to another embodiment of the present invention.

The example of FIG. 16 is different from the examples described above in that msg2 is individually transmitted according to the On durations of the paging groups, but msg3 is transmitted at a proper time after all paging groups receive msg2. In this embodiment, the transmission time of msg3 is the most important element and thus needs to be properly determined. For example, msg3 may be transmitted or received when certain time passes after msg2 is sent in the On duration of the last paging group. In this embodiment, all the methods mentioned above are applicable.

In this case, a separate indication should be provided such that the Tx UE to transmit msg3 and the Rx UE to receive msg3 can overhear the indication at the time for transmission of msg3. To this end, a scheduling node (the eNB or the cluster head) may signal, to the UE, the transmission/reception time of msg3 or the last transmission time of msg2.

In FIG. 16, for paging group #1, it may take a long time until the msg3 transmission time reaches. Accordingly, a mode that is to be set between the msg2 transmission time and the msg3 transmission time may also be important. If there is information indicating the msg3 transmission time, the sleep mode may be maintained for a certain time.

If there is other information indicating the number of page groups (for D2D broadcast) or the number of times of msg2 transmission that is to be performed (when classification of paging groups is not clear), the transmission time and reception time of msg3 are predictable. The information about the paging groups or the number of times of msg2 transmission may be delivered from the eNB to the UE. A UE to transmit a broadcast/groupcast signal preferably recognizes that msg2 can be transmitted a designated number of times, and transmits msg3 after the last transmission of msg2 is terminated. That is, preferably, if msg2 which is not the last msg2 is detected, msg3 is not transmitted.

Alternatively, msg2 transmitted by the eNB may contain a field indicating how many times msg2 will be subsequently transmitted. This field may be interpreted as a counter for the number of msg2 messages which are to be transmitted. That is, msg2 transmitted to set the counter to 0 may be considered as the last msg2. Alternatively, if the transmission time of msg3 (e.g., the positions of a radio frame and a subframe where msg3 is transmitted) is designated accurately through msg2, the UE only needs to transmit msg3 at only one time position repeatedly indicated by the msg2 messages even if the UE receives msg2 several times.

Additionally, paging groups or the msg3 transmission/reception time may be scheduled by designating an interval between paging groups (PGs) (an interval between On durations of PGs) and an interval between msg2 and msg3 such that the intervals become integer multiples of a specific unit. This tip may be helpful in performing timing verification. For example, an interval between msg2 for PG#1 and msg2 for PG#2 may be set to N time units, an interval between msg2 for PG#2 and msg2 for PG#3 may be set to M time units, and msg2 and msg3 for PG#3 may be set to K time units. Preferably, N, M, and K are integer multiples of a legacy timing unit. Alternatively, the timing unit may be N, M, or K. Alternatively, the timing unit may be the least common multiple or the greatest common denominator of candidate paging times (paging frames).

Introduction of D2D communication has been considered to ensure public safety. Accordingly, D2D communication should be allowed not only in a network coverage for intra-cell communication, which refers to communication between UEs within the coverage of an eNB, and inter-cell communication, which refers to communication between UEs positioned within coverages of different eNBs, but also in a partial network coverage which may be indirectly controlled by an eNB through other UEs positioned outside the cell or on the cell boundary. In addition, it is better to allow D2D communication to be performed in a situation which is out of control of the eNB, namely outside the network coverage. As one method to implement D2D communication outside the network coverage, it may be assumed that a UE cluster is explicitly or implicitly created, and contains a head which performs semi-centralized scheduling or full-centralized scheduling like an eNB or implement a part of the function of the eNB in place of the eNB. For example, the cluster head may perform very simple coordination. Hereinafter, D2D communication between UEs outside network coverage will be described with reference to FIGS. 9 to 13, and D2D communication performed by a UE of the partial network coverage will be described with reference to FIGS. 14 to 16. For reference, the UE may be capable of recognizing whether or not the UE is outside the network thereof using various methods such as cell scanning and cell selection. For example, the UE may determine whether the UE is inside, outside or on the boundary of a cell or network by attempting to detect or detecting a synchronization signal or a synchronization channel. Accordingly, the embodiments described above and below assume that the UE is capable of recognizing whether the UE is inside, outside or on the boundary of the network, and are applicable regardless of the method which the UE uses to recognize the location thereof. In addition, since the UE cluster is explicitly or implicitly created, the embodiments described above and below assume that the UE is capable of recognizing a cluster to which the UE belongs.

■ Outside Network Coverage

Figure 17:
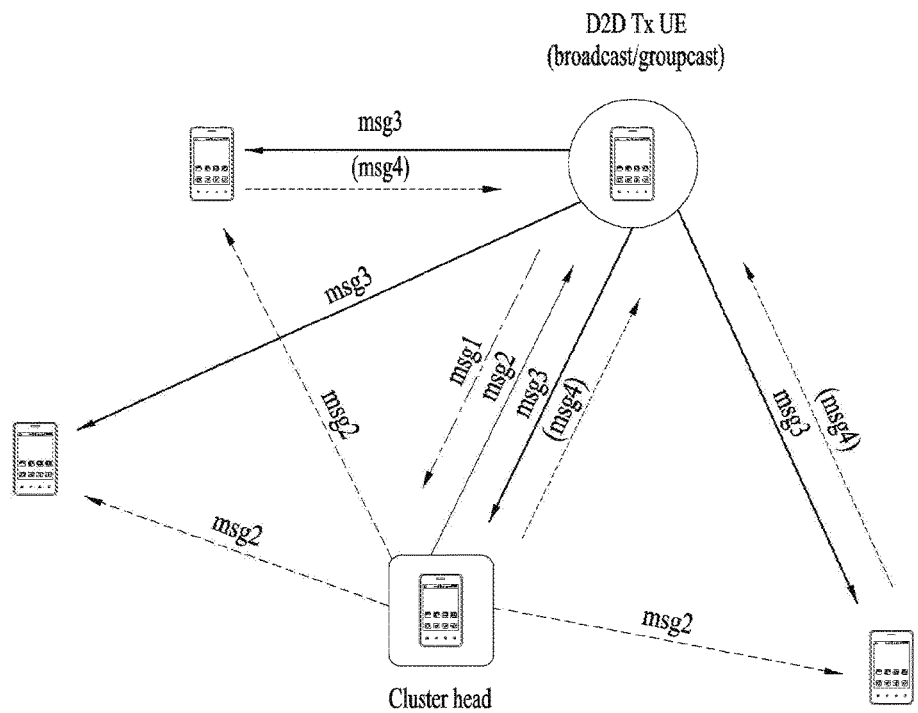
FIG. 17 illustrates D2D broadcast/groupcast performed outside coverage.

FIG. 17 illustrates D2D broadcast/groupcast performed outside coverage.

Referring to FIG. 17, a UE having a message to broadcast is referred to as a D2D broadcast/groupcast Tx UE, in short, a Tx UE, and a UE receiving the broadcast message is referred to as a D2D broadcast/groupcast Rx UE, in short, a Rx UE. The Tx UE transmits msg1, which serves to request broadcast scheduling, to a cluster head, which is partially in charge of resource management/coordination, in order to be assigned a resource consisting of one of time, frequency, sequence (code) and a combination thereof for delivery of the broadcast message. The form of Msg1 may be the same as or similar to that of an RACH preamble.

When P preamble sequences are given, some of the preamble sequences may be used for contention-based preamble transmission and the other preamble sequences may be used for non-contention-based preamble transmission. For contention-based transmission, a preamble (sequence index) resource for transmission is randomly selected from a predetermined preamble (sequence index) set. On the other end, for non-contention-based transmission, a preamble (sequence index) resource may be pre-designated/pre-assigned, or may need to be designed such that the resource is recognized explicitly or implicitly by a UE according to a transmission resource region (e.g. t_id, f_id), a UE ID, a UE group (ID), a UE priority index, and the like. For example, when msg1 is transmitted through a specific resource region, a preamble (sequence) index may be determined according to the position of the resource region. The UE may be allowed to select and apply either non-contention-based transmission or condition-based transmission without constraint. Alternatively, either non-contention-based transmission or condition-based transmission may be automatically preconfigured according to the UE application. For example, when the UE makes an emergency call, the UE may be preconfigured or fixed to attempt transmission using a contention-free source. Alternatively, a resource for transmission may be differently assigned depending on the cluster group in order to minimize collision.

Transmission of msg1 may be performed using a pre-designated time and resource (as in the case of LTE RACH access slot pre-configuration, namely PRACH reconfiguration), or may be performed using a time and resource determined based on a unique attribute (e.g., ID) of the UE.

Alternatively, transmission may be performed based on information broadcast by the cluster head with a periodicity. For example, if an Rx UE detects a specific cluster head and desires to operate in a group to which the cluster head belongs, the UE identifies a resource for a Tx UE to use to perform broadcast by monitoring the broadcast information of the cluster head. The cluster head may transmit D2D access configuration information for msg1 through a beacon, a synchronization channel, or a broadcast channel. This operation may be similar to a preliminary procedure through which the PRACH configuration should be received before transmission of the PRACH preamble. Meanwhile, configuration information containing timing information about msg1, msg2, msg3 and msg4 may be pre-provided to all D2D UEs. This method may be implemented through operation and management (OAM) or a broadcast signal.

Upon receiving msg1, the cluster head determines or schedules a time for the Tx UE to broadcast msg3, and then delivers the time information to the Tx UE using msg2. This information may be recognized through broadcast slot configuration information that is broadcast. Meanwhile, Rx UEs which desire to or must overhear msg3 should be allowed to overhear msg2. The time at which msg2 is transmitted needs to be pre-announced such that all UEs within the D2D broadcast the range can overhear msg2 or all Rx UEs within the broadcast ranging can receive msg2. That is, if the UEs know that msg1 has been transmitted by the Tx UE, the UEs may be allowed to recognize the msg2 transmission time. For example, msg2 transmission may be designed to be performed in the N_msg1-th subframe after msg1 is transmitted. Alternatively, a msg2 transmission time candidate may be determined, and the Rx UE may be caused to monitor msg2 at the determined time (e.g., subframes) and to decode a specific PDCCH upon detecting the PDCCH. For example, subframe #0 of every radio frame, every even-numbered radio frame or every odd-numbered radio frame may be pre-signaled through D2D configuration information as a msg2 transmission time candidate. The msg2 transmission time (e.g., subframe(s) having a specific subframe or subframe set or periodicity) may be pre-fixed or pre-set to a specific value. Alternatively, the msg2 transmission time may be changed through the OAM procedure. Alternatively, if the UE(s) are within the eNB coverage, the transmission time may be modified in a manner that configuration information is downloaded onto and stored in the UEs or determined by exchanging a negotiation signal with the cluster head or between UEs in a group in a distribution manner. Alternatively, the transmission time may be determined when the synchronization signal of the cluster head is received. In this case, D2D configuration information may be obtained in association with the properties (e.g., type, index, etc.) of the synchronization signal or through message information delivered together with or after the synchronization signal. The synchronization signal used for D2D communication may be a synchronization signal or a synchronization channel that is defined separately from the legacy PSS/SSS. The D2D UEs may receive a synchronization signal/channel from the cluster head or another UE and establish synchronization with other UEs participating in D2D communication.

Msg2 contains scheduling information which is necessary for msg3 broadcast. Examples of the scheduling information include a temporary ID, power control information, timing information, and cyclic prefix (CP) information. The Tx UE and Rx UEs which receive msg2 may recognize the time or resource (e.g., a transmission subframe) to transmit msg3 and the time or resource (a monitoring subframe or reception subframe) to overhear msg3.

One msg2 may be used to schedule multiple subsequent msg3 messages. It is proposed that msg2 be implemented in a manner that multiple msg3 scheduling grants are transmitted all at once as in the case of random access response (RAR) message configuration. According to this method, a scheduling command is not transmitted every time scheduling for msg3 transmission to be applied later is needed. Rather, scheduling commands for multiple msg3 messages are received simultaneously by transmitting msg2 only once.

The Tx UE transmits msg3 using a designated parameter (time, frequency, power, etc.). Msg3 may be generated using a pre-designated D2D (broadcast) temporary ID. For example, msg3 may be scrambled using the temporary C-RNTI of the LTE system and/or the international mobile subscriber identity (IMIS). Msg3 may contain a UE ID in order to resolve collision with another broadcast Tx UE. The UE ID may be separately created for D2D communication.

<Long Sequence for Reducing Collision Probability>

One method to resolve collision may be to use more kinds of sequences than the legacy RACH preamble to reduce collision possibility. As a long sequence, CAZAC sequence series, a UE ID-embedded CAZAC sequence or a Zadoff-chu sequence may be used. Although a problem such as ID redundancy may occur, a processing procedure such as hashing, which means mapping multiple UE IDs onto one new ID, may be applied to UE IDs to obtain a virtual ID or hashing ID which is shorter in length than the long sequence. Alternatively, contention resolution may be implemented using a CAZAC or Zadoff-chu sequence generated based on the obtained ID. When the length of the sequence increases, complexity of the receiver also increases. However, if a UE ID of a longer sequence is introduced to the preamble and transmitted, the number of preamble sequences increases, and therefore the probability of collision with msg1 which occurs due to random selection of the same sequence index in the msg1 step is greatly reduced. Accordingly, latency resulting from contention resolution performed in the msg4 step may be greatly reduced. In operating broadcast signals based contention, reduction of latency is particularly required for an emergency broadcast signal.

In a normal situation, the legacy RACH procedure may be utilized as much as possible. That is, for emergency broadcast, a separate preamble sequence may be used. Alternatively, a preamble sequence for emergency may be reserved. However, if the multiple UEs recognize an emergency situation and attempt emergency broadcast simultaneously, namely if msg1 transmission is simultaneously attempted, collision is unavoidable due to a restriction according to the number of reserved sequences.

<Escaping a Collision Situation by Depending on Cluster Head Scheduling>

Figure 18:
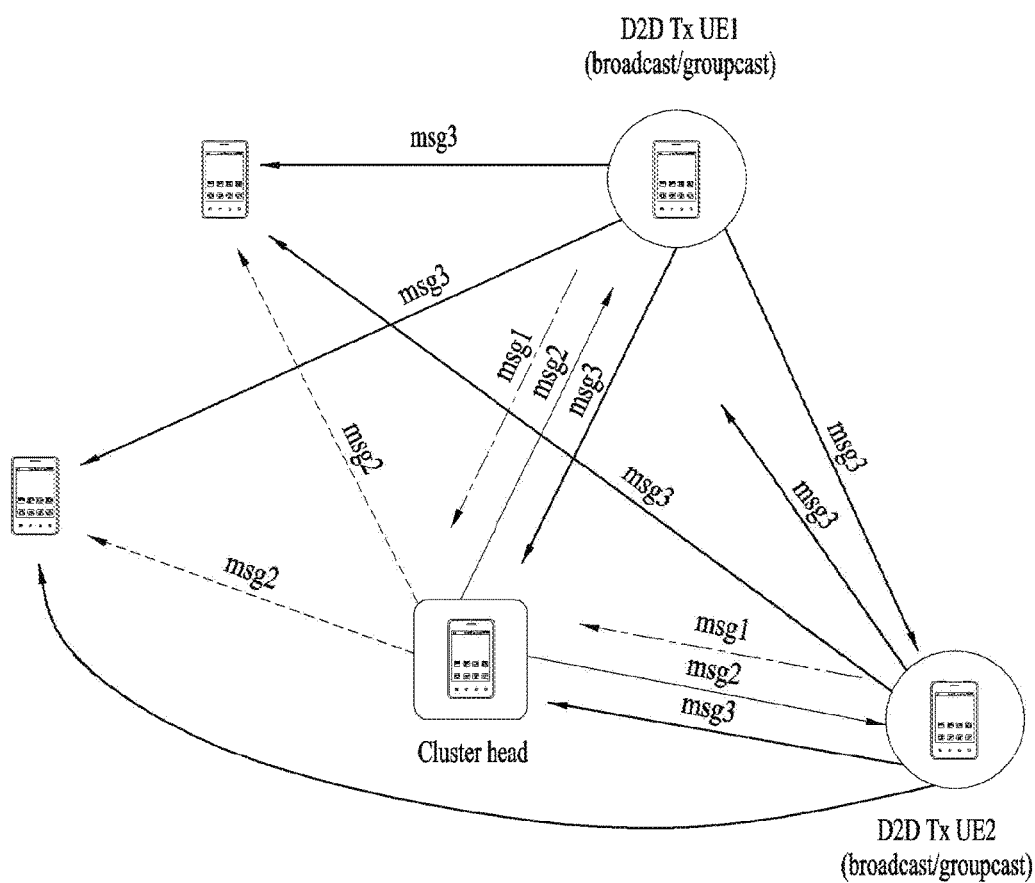
FIGS. 18 and 19 illustrate a situation wherein collision occurs between two or more UEs as the UEs attempt to perform broadcast simultaneously.
Figure 19:
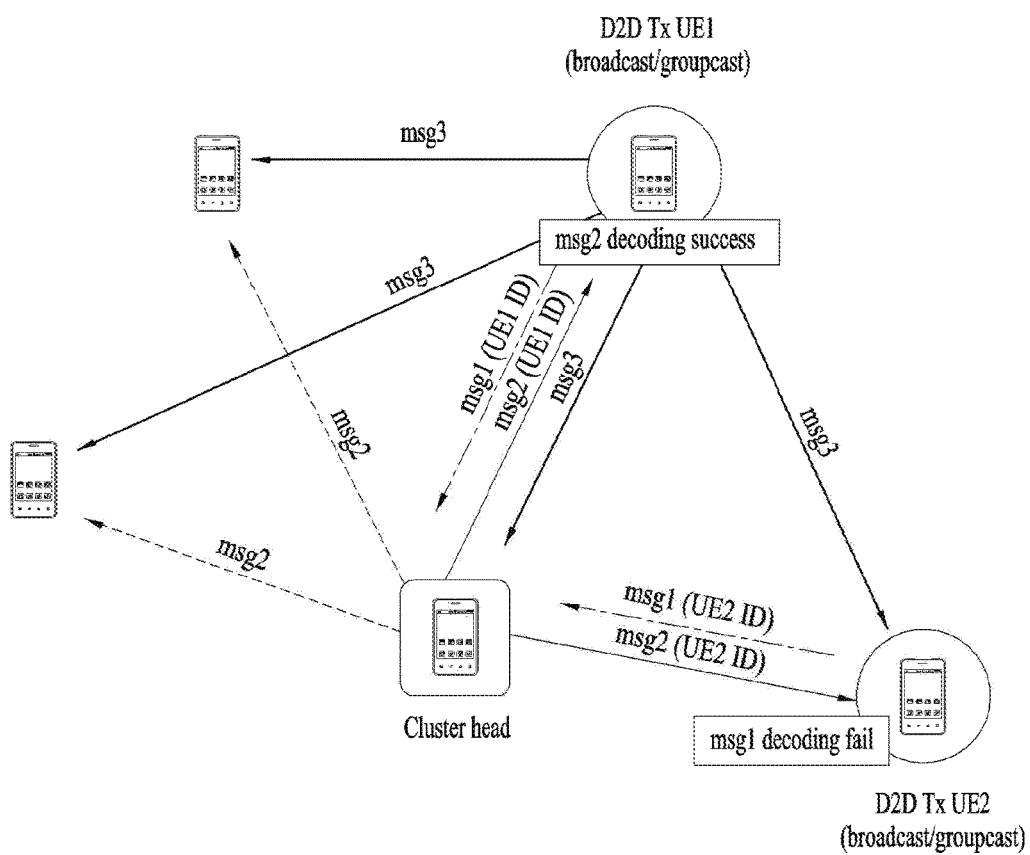

FIGS. 18 and 19 illustrate a situation wherein collision occurs between two or more UEs as the UEs attempt to perform broadcast simultaneously.

FIG. 18 illustrates a situation wherein collision occurs between msg3 messages as UE1 and UE2 attempt to perform D2D broadcast simultaneously. When multiple UEs (e.g., UE1 and UE2) transmit msg1, a cluster head may serve to select a UE from among the multiple UEs. Alternatively, a UE may select a significance level and send the same to the cluster head, and the cluster head may in turn determine a corresponding priority based on the significance level. However, if multiple UEs set the highest significance level and transmit the same, it is not easy to select a UE. Accordingly, there is a need for a method to handle broadcast message transmission requests received from multiple UEs. The most intuitive method is to provide information about fairness between UEs. For example, a UE frequently making a request may be assigned a low priority, while a UE that does not frequently make a request may be assigned a high priority. In other words, a kind of priority counter may be provided to persistently count and release requests from the UEs.

As another method, if a UE attempts but fails to make a broadcast message request, the time for a reattempt may be advanced so as to favor the UE over the other UEs. This method increases the probability of selecting the UE by increasing the number of attempts of the UE over time. This method may also be managed using a separate counter. Referring to FIG. 19, when it is assumed that UE1 is selected after UE1 and UE2 transmit msg1 based on UE IDs simultaneously, UE2 may determine occurrence of collision in the step of receiving msg2, thereby avoiding simultaneous transmission of msg3 from UE1 and UE2.

<Escaping a collision situation by becoming a cluster head>

Another function that should be implemented is to send a pre-designated message once a specific button of the UE is pressed in an emergency situation. In a situation wherein the cluster head performs scheduling based on contention, transmission of an emergency call may not be guaranteed. UEs may be preconfigured such that contention therebetween does not occur within the coverage. However, it is not easy to prevent contention between UEs outside the coverage because an eNB does not exist outside the coverage. Even if the cluster head partially performs the scheduling function of the eNB, the cluster head is limited in performing the function compared to the eNB and thus it is not easy to prevent contention between UEs. As one method to increase transmission possibility of an emergency call by attenuating contention between UEs, the present invention proposes that the Tx UE become a cluster head to schedule itself to increase possibility of broadcasting. However this method may be limited if the cluster head is determined based on contention. Accordingly, there is a need for a method to allow a UE desiring to be a cluster head in an emergency situation to become the cluster head, in addition to the condition-based determination of the cluster head. According to one method, a UE desiring to become a cluster head broadcasts information indicating that the UE desires to become a cluster head. For example, a Tx UE desiring to become the cluster head may broadcast, in the form of beacon, a cluster head decision/negotiation signal indicating that the UE desires to become a cluster head, thereby becoming a cluster head and preventing other cluster heads and other Rx UEs from becoming cluster heads. If the beacon signal is implemented in the form of a sequence, a specific sequence(s) may be reserved for the aforementioned purpose. The cluster head decision/negotiation signal may contain a priority indicator and/or an emergency situation indicator. If multiple UEs simultaneously declare that the UEs will become cluster heads, this may cause a problem. However, if it is rarely likely that multiple UEs simultaneously declare that they will become cluster heads, the aforementioned method may be useful.

Msg1 may carry a priority indicator and/or an emergency indicator. When the Tx UE transmits msg1, the Tx UE may also deliver information indicating the highest priority through msg1. If collision occurs in this process and thus msg1 is not selected by the cluster head, msg1 including information indicating a UE desiring to become a cluster head may be transmitted along with the information indicating the highest priority. If msg1 is implemented based on UE IDs, better effects may be obtained.

Meanwhile, a cluster head may signal a priority counting value or an approximate value thereof to UEs to induce the UEs to perform other operations.

This method is different from D2D broadcast/groupcast according to scheduling performed by other cluster heads in that a Tx UE desiring to perform D2D broadcast/groupcast becomes a cluster head. Even if there is already a cluster head present in the cluster to which the Tx UE belongs, the Tx UE may become a cluster head. A cluster managed by the Tx UE having become a cluster head may be a new broadcast cluster different from the cluster configured by the existing cluster head, or the Tx UE may perform the function of the existing cluster head. The latter case may correspond to a situation in which the cluster head of a specific cluster is changed. According to this embodiment, a broadcast Tx UE may voluntarily and additionally serve as a cluster head or deprive other cluster heads of positions and disable the functions of the other cluster heads. According to this embodiment, if a UE to perform emergency transmission becomes a cluster head for emergency transmission, transmission efficiency may be enhanced compared to a case where the UE is not allowed to become a cluster head. If the UE to perform emergency transmission is not allowed to become a cluster head, a UE having nothing to transmit may be maintained as a cluster head. In this case, the cluster head may perform only the function of coordinating transmission when collision occurs according to transmission from the UE to perform emergency transmission.

A more detailed description will be given of embodiments of the present invention of a relationship among a UE that voluntarily becomes a cluster head, a cluster (hereafter, broadcast cluster) managed by the UE and the existing cluster. The existing cluster may be maintained/disappear or the status of the existing cluster head may be maintained/stripped, and a new broadcast cluster may be created, according to one of the following methods (1) and (2).

(1) Creation of a new broadcast cluster in place of the existing normal cluster

Once a UE for broadcast becomes a cluster head, a new cluster is created and the existing cluster head around the UE disappears. Since the new cluster head in part belongs to the existing cluster and in part belongs to the new cluster, the existing cluster may be construed as being partially integrated into the new cluster. To make sure that the broadcast Tx UE wins the cluster head contention, conditions under which the Tx UE favorably becomes a cluster head needs to be constantly offered. To this end, various methods may be used. According to one of the methods, in performing cluster head negotiation, information indicating that the Tx UE desiring to transmit a broadcast signal has a higher priority may be exchanged, thereby increasing the chances that the Tx UE will become a cluster head. Herein, if transmission of a broadcast signal is intended, the procedures of msg1 and msg2 may not be needed. This is because the UE only needs to become a cluster head to directly schedule and broadcast a broadcast signal whenever the UE desires to transmit an emergency message. However, in a collision situation in which Tx UEs desiring to become cluster heads coexist, an additional method is needed. If multiple broadcast Tx UEs desire to become cluster heads at the same time, negotiation is needed between the Tx UEs, and the cluster head is determined based on priorities of the Tx UEs. For example, if 'Priority level=2' is preconfigured in the application of Tx UE1 and 'Priority level=4' is preconfigured in the application of Tx UE2, Tx UE1 may become a cluster head by exchanging the priority levels in the negotiation procedure. Herein, in order to prevent a Tx UE from intentionally changing the priority level thereof, the priority level may need to be configured to be unchangeable. The applications having priority levels, which are simply illustrative, assume that, for example, when numbers such as "911" are input or an emergency call button is pressed, a priority level associated therewith is delivered in the negotiation procedure. Preferably, the priority levels are applied only to public disaster applications or public disaster broadcast signals.

In the proposed scheme, the broadcast cluster is a new cluster having only the scheduling function, and information such as a timing reference may be obtained from an existing normal cluster. For example, to temporarily secure only the scheduling function of transmitting a broadcast signal, a Tx UE may intentionally create a broadcast cluster and become a cluster head to transmit the broadcast message. In this case, the existing normal reference may be maintained as a synchronization reference. Thereby, a burden of reestablishment of synchronization due to the broadcast cluster that suddenly appears and disappears may be lessened for cluster UEs.

(2) Creation of a New Broadcast Cluster on Top of the Existing Normal Cluster

A layered broadcast cluster may be formed in an overlay form by a broadcast cluster head which is completely different from the existing cluster head. A broadcast message such as an emergency signal may be directly transmitted by the broadcast cluster formed in this way. In this case, a special purpose such as emergency broadcasting may be achieved only when the broadcast cluster has the highest priority. Accordingly, the broadcast cluster head preferably has a higher authority than the existing cluster head. The broadcast cluster head may transmit, for example, a (emergency) broadcast beacon as desired, namely, with a high (or the highest) priority in the cluster On/Off duration that has been managed by the existing cluster head. Thereby, the broadcast cluster head may deliver information indicating "Now a new cluster will be created or has been created" and, when necessary, information indicating "On/Off duration of the newly created cluster". For example, such information may be broadcast through a beacon or pre-broadcast or may be preconfigured. A UE receiving broadcast beacon should receive a message is transmitted from the new cluster head for the On duration of the new cluster outside the On duration of the existing cluster.

Basic operations of the cluster head which are performed after the cluster head is determined according to the two proposed methods are summarized below.

1) Any UE becomes the cluster head.

2) The cluster head configures a certain interval as an integral for announcing the intention of transmission.

3) A UE having data to send announces the intention of transmission in the corresponding interval and then transmits data.

4) If the Rx UE does not find anything in the interval where the intention has been announced, the Rx UE enters the Off duration.

<A Method for Implementing ACK/NACK in Case of an Error in Msg3>

Transmission of msg3 may or may not require an acknowledgment. For example, when groupcast is performed to implement group communication, a HARQ acknowledgment may be set to be received for a delivered packet. In this case, a target to receive the HARQ acknowledgment and a method to deliver the HARQ acknowledgment need to be determined. Considering point to point HARQ, ACK/NACK may be fed back to the transmitter. Similarly, in the case of a broadcast signal, whether or not reception of the signal is successful may be signaled to the Tx UE.

When M UEs out of N UEs send acknowledgments (M<N or M=N), various methods may be used to combine the ACK/NACK messages to make a final decision. As a simple method, a majority rule may be applied. If the proportion of NACK is less than or equal to a certain percentage, transmission may be considered to be successful. If the proportion is greater than the certain percentage, an operation such as attempting to perform retransmission may be performed. Alternatively, the cluster head may combine ACK/NACK from multiple Rx UEs and deliver a finally determined value to the Tx UE. Herein, the aforementioned method may be implementable when the Tx UE delivers the same packet to the multiple UEs of a group. However, if the Tx UE delivers different packets to different UEs, the HARQ operation is preferably managed individually for respective links.

When the aforementioned method is used, a UE in the idle mode or a UE in a discontinuous reception (DRX) mode may not overhear a broadcast message. Accordingly, when the cluster head receives msg1, the UE in the idle mode may need to be caused to wake up to signal, to the UE, when msg3 will be transmitted. In this case, there may be latency and thus the transmission time of msg3 may need to be determined in consideration of latency. For the legacy RACH, when msg2 is received in the subframe n, msg3 is transmitted in subframe n+k (e.g., k>4 or 5 or 6 or . . . ). On the other hand, in the present invention, msg3 needs to be transmitted in consideration of time taken until the UE in the idle mode can overhear the message. To reduce the latency and efficiently operate D2D communication, new paging with lowered latency may be introduced for a D2D enabled UE.

<Necessity of Msg4 for Handling Collision of Msg3>

When reception of msg3 fails outside the coverage, the Rx UE needs to make a response thereto. When transmitted msg3 consists of a control part (PDCCH) and a data part (PDSCH), msg3 reception failure may be classified into a case of an error in the control part (PDCCH/EPDCCH) and a case of an error in the data part (PDSCH/PUSCH). Herein, the HARQ operation is applicable to the data part. To simplify the system, the only the case of an error in the control part may be considered. If checking the cyclic redundancy check (CRC) for the control part is successful, ACK may be fed back. If the checking fails, NACK may be fed back. For example, the Rx UE may perform CRC checking for the control part (PDCCH or EPDCCH) masked based on a virtual ID and feed back ACK or NACK according to the result of CRC checking. A message used for a feedback signal is called msg4. That is, in this embodiment, msg4 is used as alternative information for checking if msg3 reception is successful. Thereby, msg4 is used to determine not only whether the control part is received but also whether the data part is received. Of course, successful reception of the control part does not guarantee successful reception of the data part. However, it is expected that the probability of reception of the control part will be similar to that of reception of the data part in most cases. Accordingly, error checking may be sufficiently performed based on the control part alone.

Next, the data part (e.g., PDSCH or PUSCh carrying msg3) may not be decoded and thus an error may occur. In this case, msg4 may be used to finally signal whether or not decoding is successful. For broadcast and groupcast, however, it may not be necessary to check final information acquisition. That is, management of broadcast or groupcast may be sufficiently performed even if only delivery of control information such as the control part (PDCCH/EPD-CCH) is checked and an acknowledgment is sent based on the checking.

In checking the control part error, control information in a format different from that of PDCCH/EPDCCH may be delivered. Further, the control part may be configured in the format of a preamble and a message, and may employ a basic configuration unit (e.g., a resource element group (REG), a control channel element (CCE), an enhanced CCE (e CCE), an aggregation method and a mapping method which are different from those for the PDCCH/EPDCCH.

Msg4 may also be needed for communication outside the network. Msg4 may be used outside the network at least in order to determine whether or not the aforementioned collision of msg3 occurs. For D2D communication outside the network, whether msg4 needs a function to check successful decoding of msg3 depends on the case. For example, the virtual ID described above or an equivalent ID may be used to transmit, through msg4, a signal indicating only whether msg3 has been correctly detected. If control information (e.g., information including a modulation and coding scheme (MCS) or a new data indicator (NDI)) is separately encoded in msg3, the Tx UE ID may also be included in msg3.

For reference, since there are multiple receivers of msg3 outside the network, msg3 collision may have a different meaning from the convention cases. For example, when UE1, UE2, UE3, UE4 and UE5 are arranged in this order, if UE1 and UE5 transmit msg3 on the same resource simultaneously, each of UE2 and UE4 may successfully receive msg3 from either UE1 or UE5 that is close thereto, while UE3 may fail to receive msg3 from both UE1 and UE5.

Figure 20:
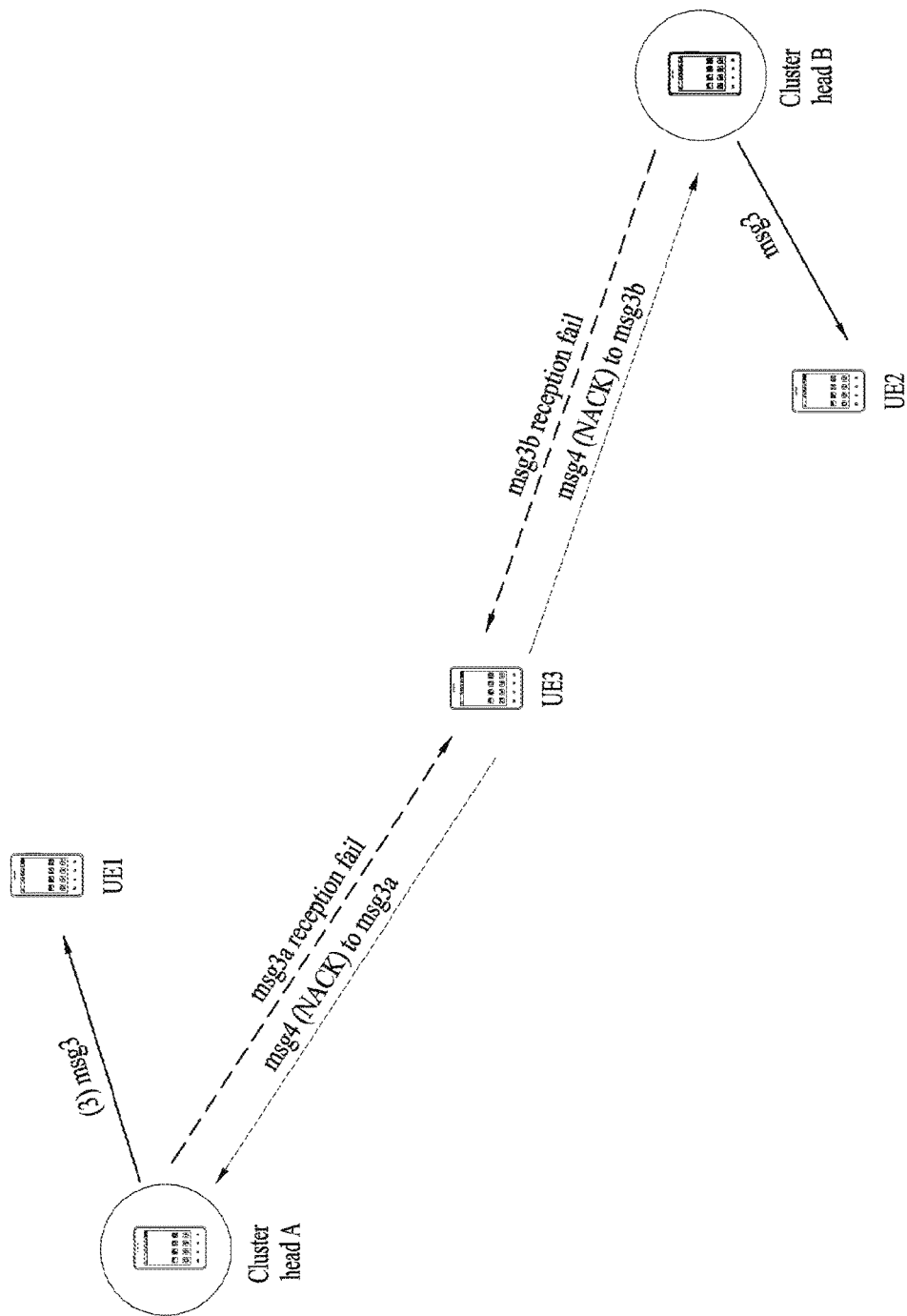
FIG. 20 illustrates exemplary utilization of msg4 for receiving multiple msg3 messages.

FIG. 20 illustrates exemplary utilization of msg4 for receiving multiple msg3 messages.

Referring to FIG. 20, when multiple Tx UEs perform broadcast and multiple Rx UEs receive broadcast signals, UE3 may redundantly receive msg3 messages since msg3 is transmitted from two Tx UEs simultaneously. As a result, UE3 may fail to properly receive msg3. In this case, when it is assumed that UE3 recognizes presence of cluster head A and cluster head B, UE3 may transmit msg4 to report NACK for both msg3 messages. In this embodiment, it is assumed that UE3 which is accurately aware of the timing of reception of msg3 from both cluster heads is capable of recognizing collision caused by simultaneous transmission of msg3 when the msg3 reception times coincide. In this case, msg4 may be fed back in a manner that NACK is scrambled with a cluster head UE ID or virtual ID and then transmitted.

■ Partial Network Coverage

Hereinafter, description will be given of D2D communication implemented in the situation of partial network coverage when the broadcast Tx UE is within the coverage and when the broadcast Tx UE is outside the coverage.

Figure 21:
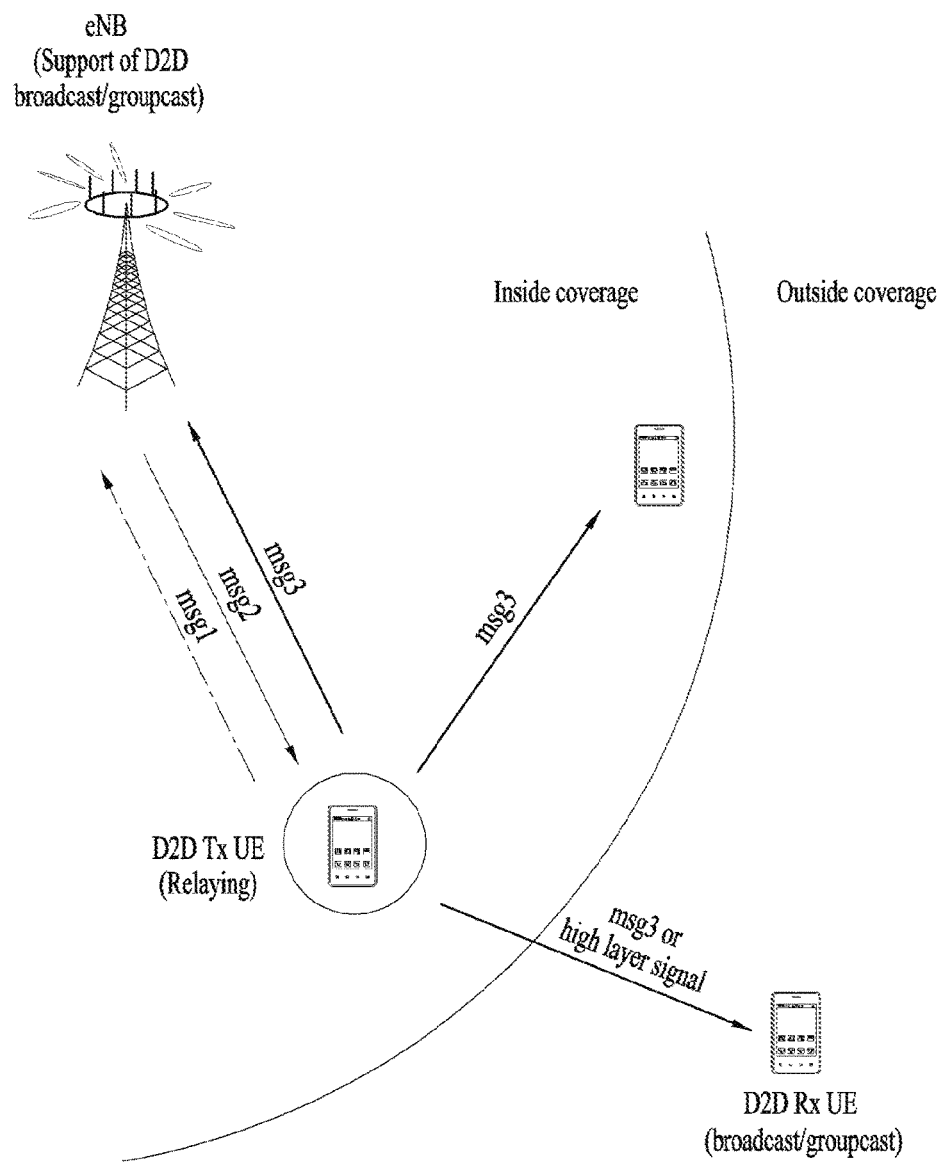
FIGS. 21 to 23 illustrate D2D communication under partial network coverage.
Figure 22:
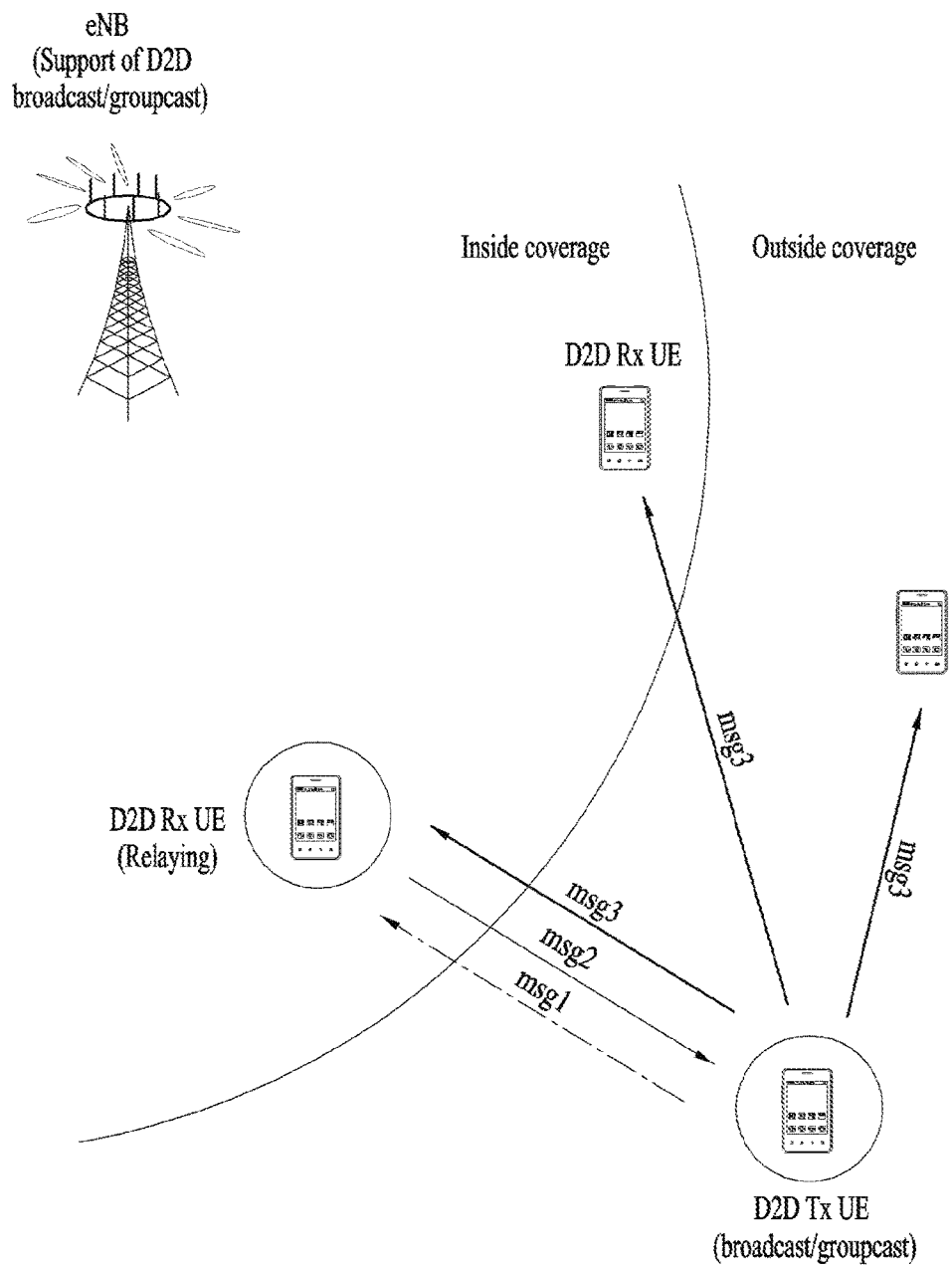
Figure 23:
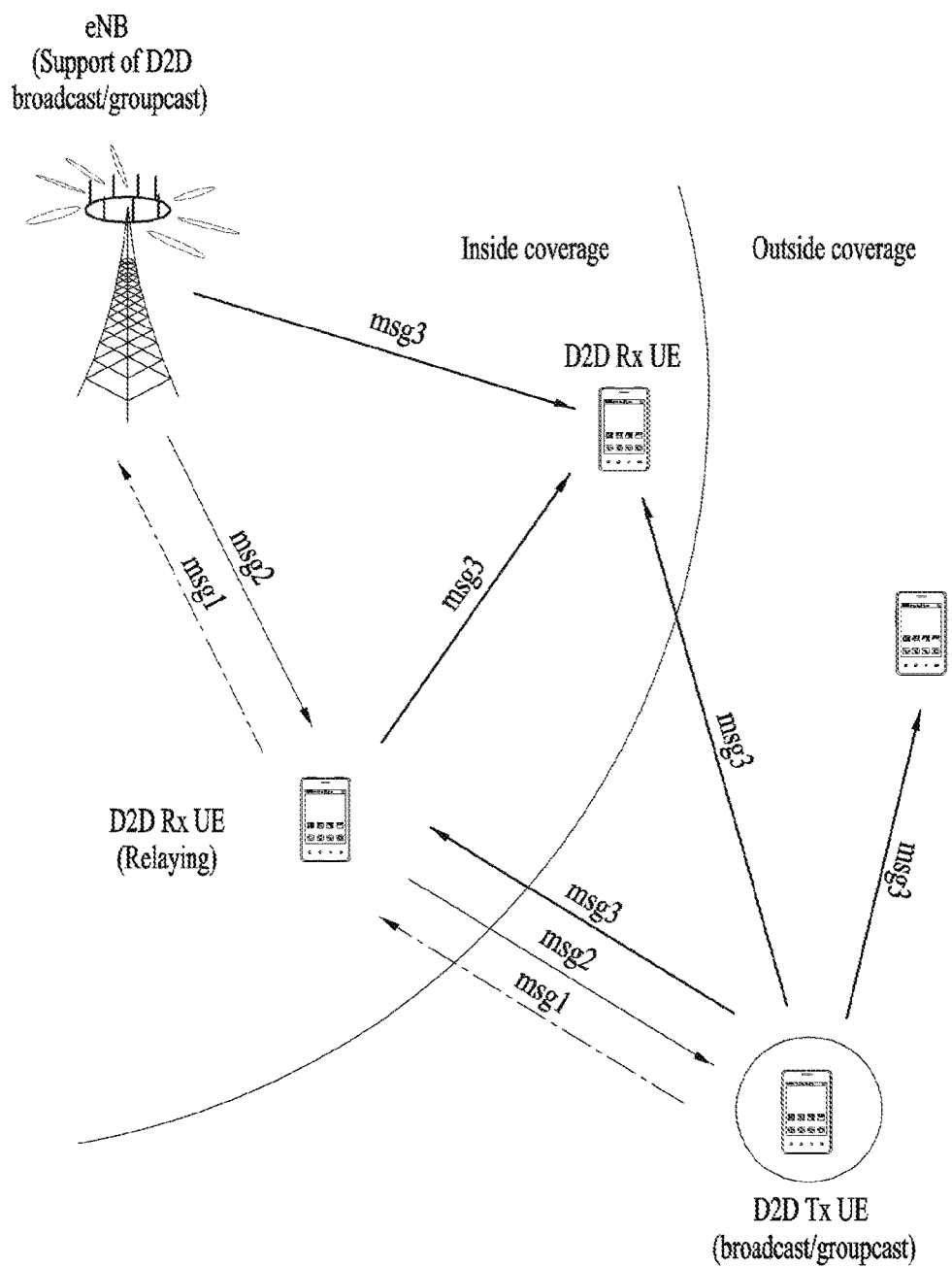

FIGS. 21 and 23 illustrate D2D communication under partial network coverage. Specifically, FIG. 21 illustrates a case where a D2D broadcast UE is positioned within the coverage, and FIGS. 22 and 23 illustrate a case where the D2D broadcast UE is positioned outside the coverage.

Referring to FIG. 21, since the D2D broadcast Tx UE within the coverage, simply referred to as a Tx UE, has a connection with an eNB, the Tx UE may signal that the UE is in an emergency situation and secure a resource on which transmission of a broadcast signal is possible. For example, the Tx UE may signal the emergency situation by performing transmission using a resource or preamble index reserved when msg1 was transmitted. In addition, the Tx UE may be assigned a resource through msg2, and transmit msg3. Thereby, the Tx UE may send an emergency message without suffering collision or latency.

Referring to FIG. 22, in the case where the D2D Dixie UE is outside the coverage, when it is assumed that the Tx UE is basically provided with a relay service from a UE within the network, it may be assumed that the coordination operation is substantially performed by the eNB since synchronization operates based on the network and, when necessary, requests can be delivered via the relay node. Accordingly, when the D2D Tx UE is outside the coverage in the situation of partial network coverage, broadcast messages msg1, msg2 and msg3 may be sequentially delivered in this order, which is similar to the operation performed when the D2D Tx UE is within the coverage. In contrast with the case where all UEs participating in D2D communication are positioned within the coverage, the Tx UE delivers msg1 to the eNB via the relay UE.

Referring to FIG. 23, msg3 initiated by the Tx UE positioned outside the coverage may reach the relay UE, and the relay UE may in turn serve to relay msg3 that has been broadcast. The eNB may also participate in relaying msg3 when msg3 is delivered all the way to the eNB.

Figure 24:
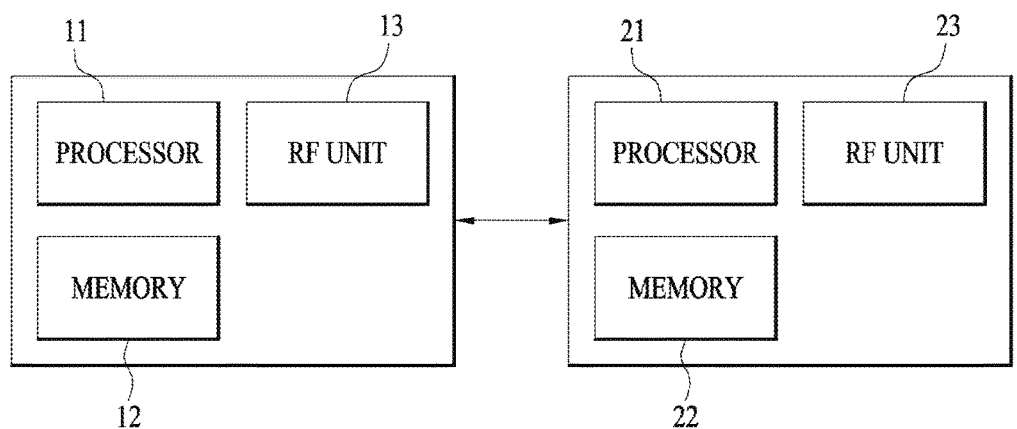
FIG. 24 is a block diagram illustrating elements of a transmitting device 10 and a receiving device 20 for implementing the present invention.

FIG. 24 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into Nlayer layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include Nr (where Nr is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The Tx UE RF processor operates according to one of the embodiments of Case A or one of the embodiments of Case B based on the AAP or an indicator corresponding or similar thereto. For example, if the AAP around the Tx UE is low, the Tx UE RF processor may control the RF unit and/or the memory of the Tx UE according to one of the embodiments of Case A. Otherwise, the Tx UE RF processor may control the RF unit and/or the memory of the Tx UE according to one of the embodiments of Case B.

The Rx eNB processor or the Rx UE processor performs signal reception according to an embodiment of Case A or Case B based on the AAP thereto. For example, if the AAP around the Rx UE/eNB UE, the Rx UE/eNB RF processor may control the RF unit and/or the memory of the Rx UE/eNB UE to receive a signal according to one of the embodiments of Case A. Otherwise, the Rx UE/eNB RF processor may control the RF unit and/or the memory of the Rx UE/eNB UE to receive a signal according to one of the embodiments of Case B.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

What is claimed is:

1. A method for transmitting a signal to a reception apparatus, the method performed by a first transmission apparatus and comprising:
   selecting a first transmission scheme or a second transmission scheme based on a number of other transmission apparatus attempting to access to the reception apparatus; and
   transmitting the signal to the reception apparatus according to the selected first or second transmission scheme,
   wherein the first transmission scheme is selected when the number of other transmission apparatus is lower than a reference value,
   wherein the second transmission scheme is selected when the number of other transmission apparatus is not lower than the reference value,
   wherein the first transmission scheme comprises:
       transmitting one access preamble sequence of a predetermined number of access preamble sequences;
       receiving an access response corresponding to the transmitted one access preamble sequence; and
       transmitting the signal using a resource according to the received access response, and
   wherein the second transmission scheme comprises transmitting the signal using a predefined resource.

2. The method according to claim 1, wherein the first transmission apparatus and the reception apparatus are user devices supporting device-to-device (D2D) communication.

3. The method according to claim 1, wherein the predefined resource is determined based on at least an identifier of the first transmission apparatus or a transmission time of the signal.

4. The method according to claim 1, wherein the second transmission scheme further comprises:
   generating a first layer by coding the signal at a first coding rate;

generating a second layer by coding the signal at a second coding rate; and transmitting the generated first layer and second layer using the predefined resource.

5. The method according to claim 1, wherein the signal has a high transmission priority.

6. The method according to claim 1, wherein transmitting the signal comprises broadcasting.

7. A first transmission apparatus for transmitting a signal to a reception apparatus, the transmission apparatus comprising:

a radio frequency (RF) unit configured to transmit and receive signals; and a processor configured to:

select a first transmission scheme or a second transmission scheme based on a number of other transmission apparatus attempting to access to the reception apparatus; and control the RF unit to transmit the signal to the reception apparatus according to the selected first or second transmission scheme, wherein the first transmission scheme is selected when the number of other transmission apparatus is lower than a reference value, wherein the second transmission scheme is selected when the number of other transmission apparatus is not lower than the reference value, wherein the first transmission scheme comprises:

controlling the RF unit to transmit one access preamble sequence of a predetermined number of access preamble sequences;

controlling the RF unit to receive an access response corresponding to the transmitted one access preamble sequence; and controlling the RF unit to transmit the signal using a resource according to the received access response, and wherein the second transmission scheme comprises controlling the RF unit to transmit the signal using a predefined source.

8. The transmission apparatus according to claim 7, wherein the first transmission apparatus and the reception apparatus are user devices supporting device-to-device (D2D) communication.

9. The transmission apparatus according to claim 7, wherein the predefined resource is determined based on at least an identifier of the first transmission apparatus or a transmission time of the signal.

10. The transmission apparatus according to claim 7, wherein the second transmission scheme further comprises:

generating a first layer by coding the signal at a first coding rate;

generating a second layer by coding the signal at a second coding rate; and transmitting the generated first layer and second layer using the predefined resource.

11. The transmission apparatus according to claim 7, wherein the signal has a high transmission priority.

12. The transmission apparatus according to claim 7, wherein transmitting the signal comprises broadcasting.

* * * * *